US012326678B2

(12) United States Patent
Saito et al.

(10) Patent No.: US 12,326,678 B2
(45) Date of Patent: Jun. 10, 2025

(54) IMAGE FORMING APPARATUS WITH BLOWN-AIR SEPARATION OF RECORDING MATERIAL FROM FIXING MEMBER

(71) Applicant: CANON KABUSHIKI KAISHA, Tokyo (JP)

(72) Inventors: Shutaro Saito, Tokyo (JP); Keisuke Yoshida, Chiba (JP); Yuya Yamada, Chiba (JP); Taku Ashida, Shizuoka (JP); Asuna Fukamachi, Chiba (JP); Yusuke Yamaguchi, Chiba (JP); Shohei Tsuzaki, Chiba (JP); Hiroshi Miyamoto, Saitama (JP); Yasuharu Toratani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/465,888

(22) Filed: Sep. 12, 2023

(65) Prior Publication Data

US 2024/0126194 A1 Apr. 18, 2024

(30) Foreign Application Priority Data

Oct. 17, 2022 (JP) ................................ 2022-166245
Oct. 17, 2022 (JP) ................................ 2022-166247
Oct. 17, 2022 (JP) ................................ 2022-166250

(51) Int. Cl.
*G03G 15/20* (2006.01)
*B65H 29/54* (2006.01)

(52) U.S. Cl.
CPC ......... *G03G 15/2028* (2013.01); *B65H 29/54* (2013.01)

(58) Field of Classification Search
CPC ............................ G03G 15/2028; B65H 29/54
USPC ................................. 399/323; 271/309, 900
See application file for complete search history.

(56) References Cited

U.S. PATENT DOCUMENTS

| | | | | |
|---|---|---|---|---|
| 8,779,335 | B2 | 7/2014 | Saito | B21B 27/06 |
| 8,958,716 | B2 | 2/2015 | Saito | G03G 15/20 |
| 9,207,593 | B2 | 12/2015 | Fukamachi | G03G 15/20 |
| 9,291,991 | B2 | 3/2016 | Yoshida | G03G 15/16 |
| 9,310,724 | B2 | 4/2016 | Fukuda et al. | G03G 15/20 |
| 9,367,006 | B2 | 6/2016 | Yoshida et al. | G03G 15/20 |
| 9,389,554 | B2 | 7/2016 | Tanaka et al. | G03G 15/20 |
| 9,465,336 | B2 | 10/2016 | Saito et al. | G03G 15/20 |
| 9,563,163 | B2 | 2/2017 | Tanaka et al. | G03G 15/00 |
| 10,241,433 | B2 | 3/2019 | Tanaka et al. | G03G 15/20 |
| 10,241,455 | B2 | 3/2019 | Fukamachi et al. | G03G 15/20 |
| 10,274,877 | B2 | 4/2019 | Maeda et al. | G03G 15/20 |
| 10,379,471 | B2 | 8/2019 | Takematsu et al. | G03G 15/20 |

(Continued)

FOREIGN PATENT DOCUMENTS

| | | |
|---|---|---|
| JP | S60-247672 | 12/1985 |
| JP | 2007-094327 | 4/2007 |

(Continued)

OTHER PUBLICATIONS

U.S. Appl. No. 18/461,428, filed Sep. 5, 2023.

*Primary Examiner* — Robert B Beatty
(74) *Attorney, Agent, or Firm* — Venable LLP

(57) ABSTRACT

An image forming apparatus includes a first rotatable member, a second rotatable member, an air nozzle, and a pipe. The pipe includes a portion extending along a widthwise direction of the first rotatable member perpendicular to a recording material feeding direction.

22 Claims, 16 Drawing Sheets

(56) References Cited

U.S. PATENT DOCUMENTS

| | | | | |
|---|---|---|---|---|
| 10,437,185 | B2 | 10/2019 | Yamaguchi et al. | G03G 15/20 |
| 10,452,006 | B2 | 10/2019 | Hashimoto et al. | G03G 15/20 |
| 10,545,442 | B1 | 1/2020 | Hirano et al. | G03G 15/20 |
| 10,564,578 | B2 | 2/2020 | Maeda et al. | G03G 15/20 |
| 10,627,751 | B2 | 4/2020 | Hasegawa et al. | G03G 15/20 |
| 10,768,569 | B2 | 9/2020 | Saito | G03G 15/00 |
| 10,802,430 | B2 | 10/2020 | Toratani et al. | G03G 15/20 |
| 10,859,953 | B2 | 12/2020 | Fukamachi et al. | G03G 15/20 |
| 10,877,412 | B2 | 12/2020 | Yashiro et al. | G03G 15/20 |
| 10,955,775 | B2 | 3/2021 | Kawai et al. | G03G 15/20 |
| 11,022,920 | B2 | 6/2021 | Kozuma et al. | G03G 15/20 |
| 11,194,275 | B2 | 12/2021 | Takemasa et al. | G03G 15/20 |
| 11,269,272 | B2 | 3/2022 | Tatezawa et al. | G03G 15/20 |
| 11,281,141 | B2 | 3/2022 | Toratani et al. | G03G 15/20 |
| 11,294,313 | B2 | 4/2022 | Hasegawa et al. | G03G 15/20 |
| 11,300,904 | B2 | 4/2022 | Kawai et al. | G03G 15/20 |
| 11,300,906 | B2 | 4/2022 | Takemasa et al. | G03G 15/20 |
| 11,347,169 | B2 | 5/2022 | Saito et al. | G03G 15/20 |
| 11,474,464 | B2 | 10/2022 | Tanaka et al. | G03G 15/20 |
| 11,609,526 | B2 | 3/2023 | Saito | G03G 15/00 |
| 11,714,370 | B2 | 8/2023 | Saito et al. | G03G 15/20 |
| 2011/0217091 | A1* | 9/2011 | Hirose | G03G 15/20<br>399/323 |
| 2012/0051804 | A1* | 3/2012 | Takeshita | G03G 15/2028<br>399/323 |
| 2012/0224893 | A1* | 9/2012 | Yamamoto | G03G 15/2028<br>399/323 |
| 2015/0185670 | A1* | 7/2015 | Tanaka | G03G 15/2028<br>399/323 |
| 2017/0010568 | A1* | 1/2017 | Kozuma | G03G 15/2028 |
| 2018/0032006 | A1* | 2/2018 | Yamazaki | G03G 15/5029 |

FOREIGN PATENT DOCUMENTS

| | | |
|---|---|---|
| JP | 2007-187791 | 7/2007 |
| JP | 2011-257670 | 12/2011 |
| JP | 2012-123289 | 6/2012 |

* cited by examiner (a)

(b)

IMAGE FORMING APPARATUS WITH BLOWN-AIR SEPARATION OF RECORDING MATERIAL FROM FIXING MEMBER

FIELD OF THE INVENTION AND RELATED ART

The present invention relates to an image forming apparatus such as a copying machine, a printer, a facsimile machine, or a multi-function machine having a plurality of functions of these machines.

The image forming apparatus includes a fixing device for fixing a toner image, carried on a recording material, on the recording material. In the fixing device, the toner image on the recording material is fed while being heated in a nip between a fixing member and a nip forming member. At this time, there is a liability that the recording material is stuck to the fixing member and is not peeled off from the fixing member. For this reason, in order to peel off the recording material from the fixing member, a constitution provided with a nozzle for blowing air to a leading end of the recording material is proposed (Japanese Laid Open Patent Application Nos. Sho60 247672 and 2007 94327).

Here, in the case of the constitution in which the recording material is peeled off from the fixing member by blowing the air to the recording material, the toner image on the recording material is cooled by the air blown from the nozzle in some instances. The cooled toner image changes in glossiness depending on a temperature for cooling the toner image, and therefore, there is a liability that uneven glossiness occurs on the toner image.

SUMMARY OF THE INVENTION

A principal object of the present invention is to provide an image forming apparatus capable of suppressing an occurrence of uneven glossiness on a toner image in a constitution in which a recording material is peeled off from a fixing member by blowing air to the recording material.

According to an aspect of the present invention, there is provided an image forming apparatus comprising: a first rotatable member configured to heat a toner image formed on a recording material; a second rotatable member configured to form a nip in contact with the first rotatable member, wherein the second rotatable member applies heat and pressure to the recording material, on which the toner image is carried, in the nip in cooperation with the first rotatable member to fix the toner image on the recording material; an air nozzle configured to blow air toward the recording material and the first rotatable member on a side downstream of the nip with respect to a feeding direction of the recording material; and a pipe configured to guide air to the air nozzle and of which surface opposing the first rotatable member is metal, wherein the pipe includes a portion extending along a widthwise direction of the first rotatable member perpendicular to the feeding direction.

Further features of the present invention will become apparent from the following description of exemplary embodiments with reference to the attached drawings.

Figure 5:
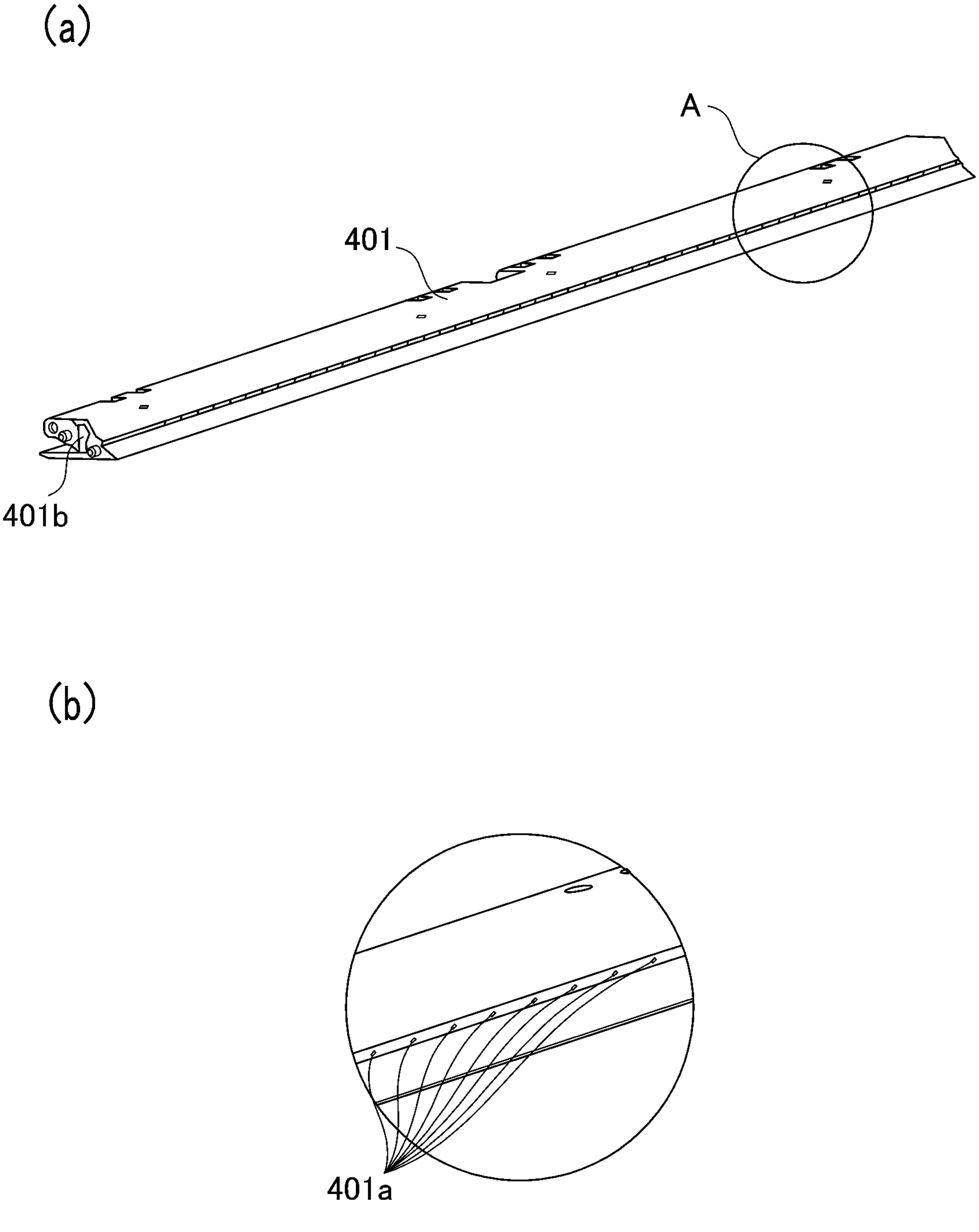

Part (a) of FIG. 5 is a perspective view of the air nozzle in the first embodiment, and part (b) of FIG. 5 is an enlarged view of an A portion of part (a) of FIG. 5.

Figure 6:
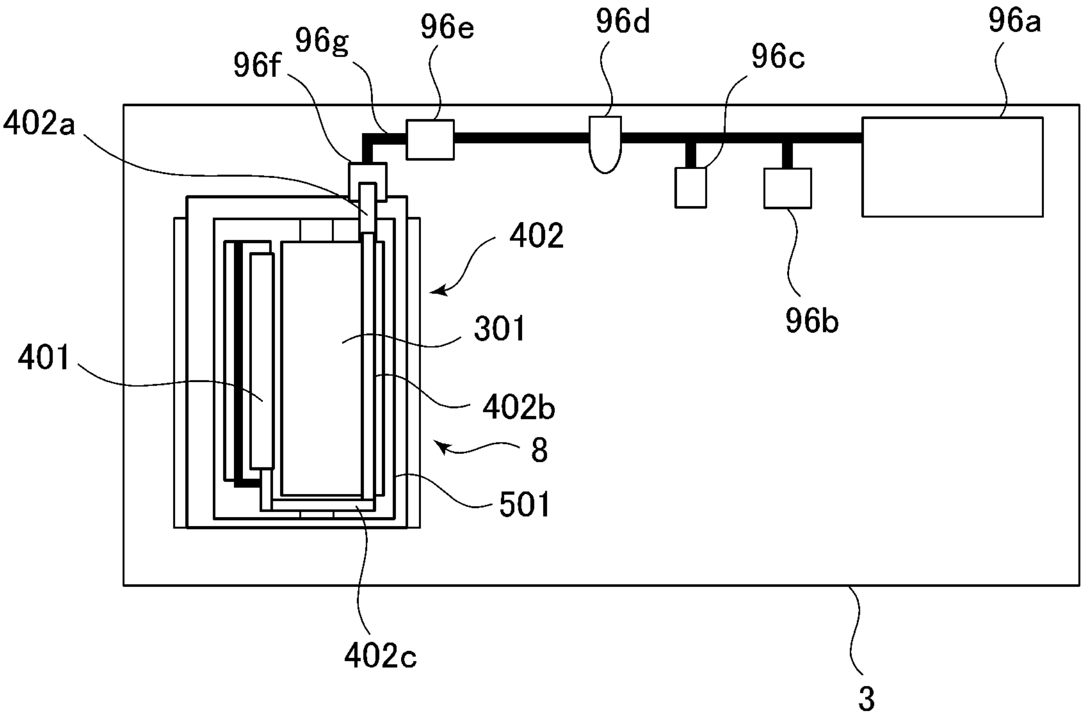

FIG. 6 is a schematic view of a passage from an air compressor to the air nozzle in the first embodiment as viewed from above.

Figure 7:
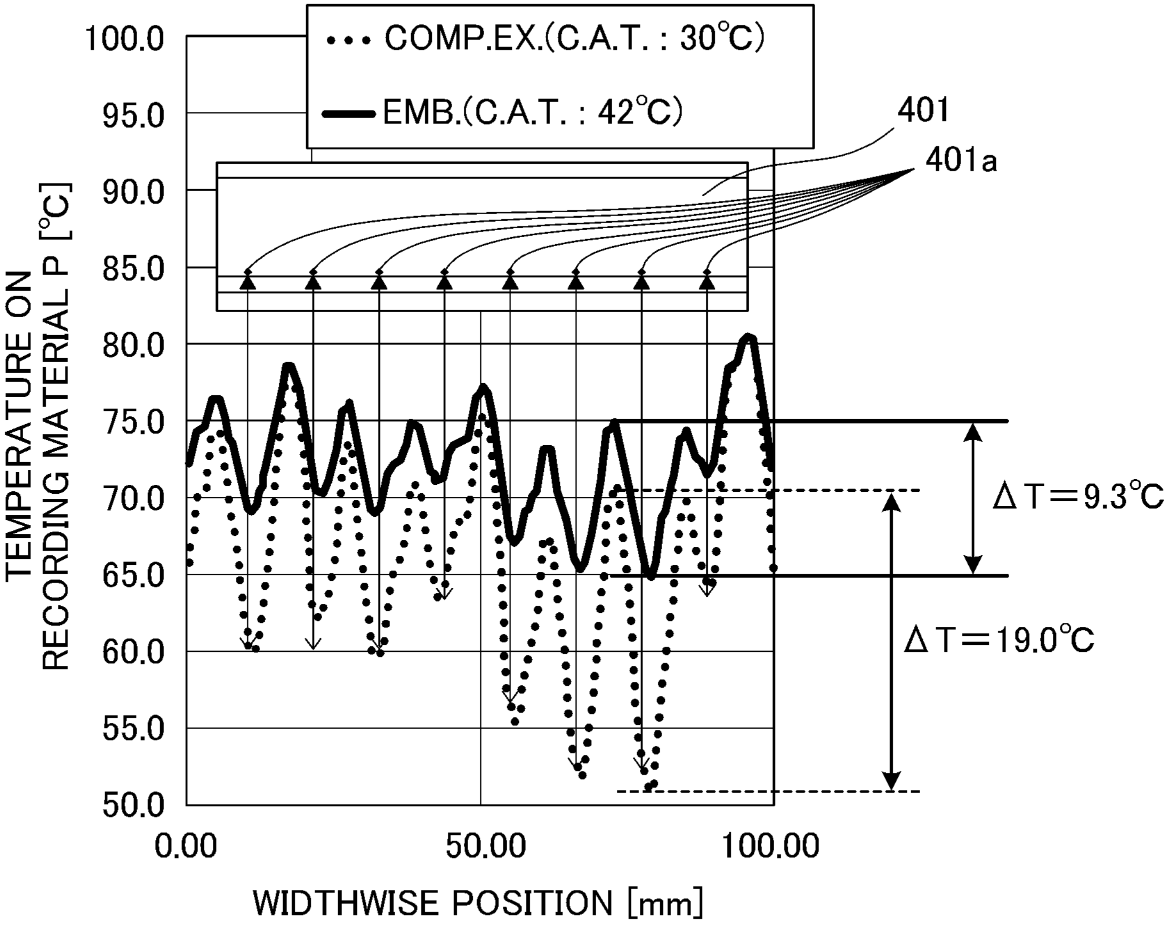

FIG. 7 is a graph showing a temperature distribution on a recording material in each of an embodiment and a comparison example.

Figure 8:
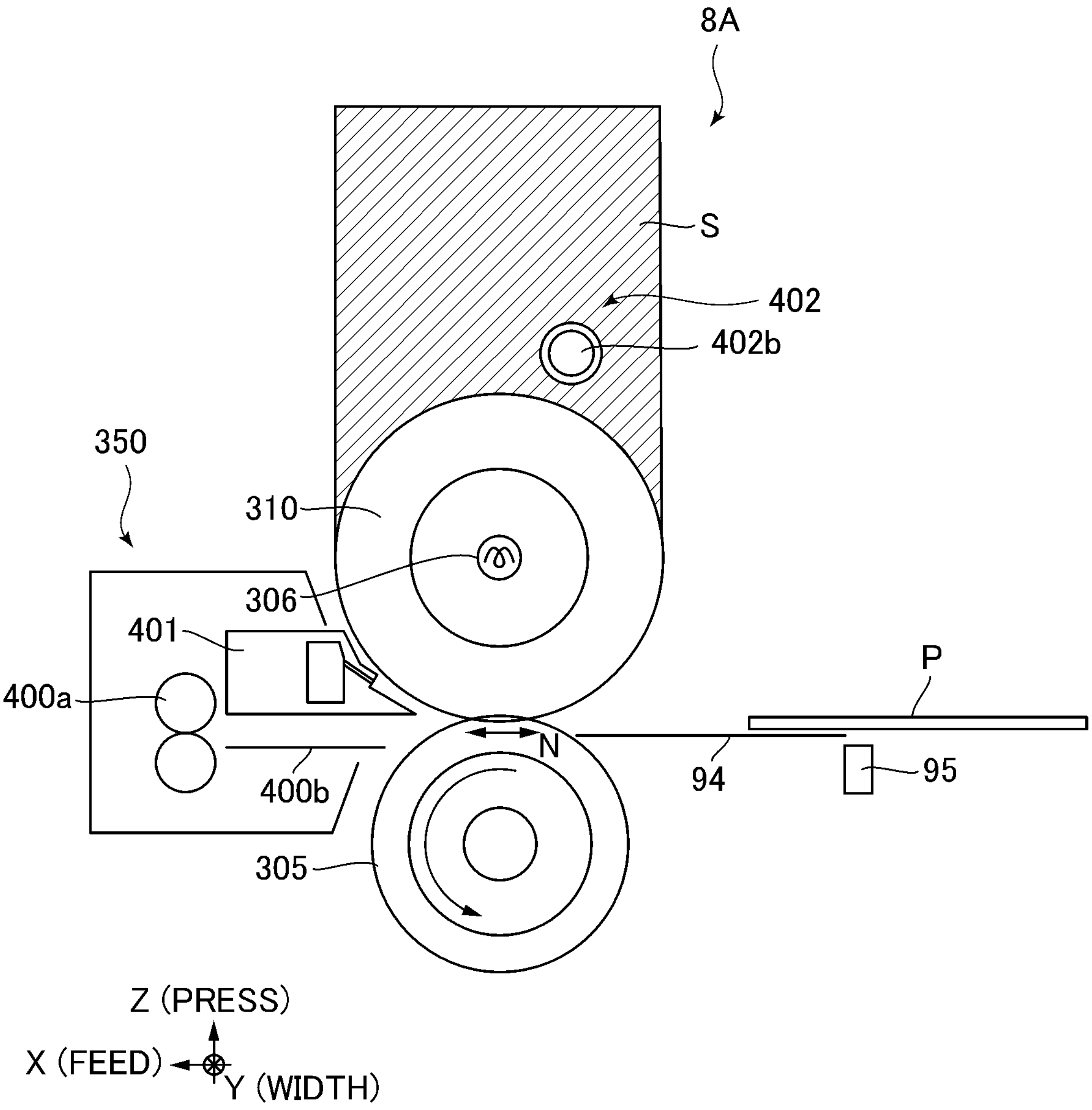

FIG. 8 is a schematic sectional view of a fixing device in a second embodiment.

Figure 9:
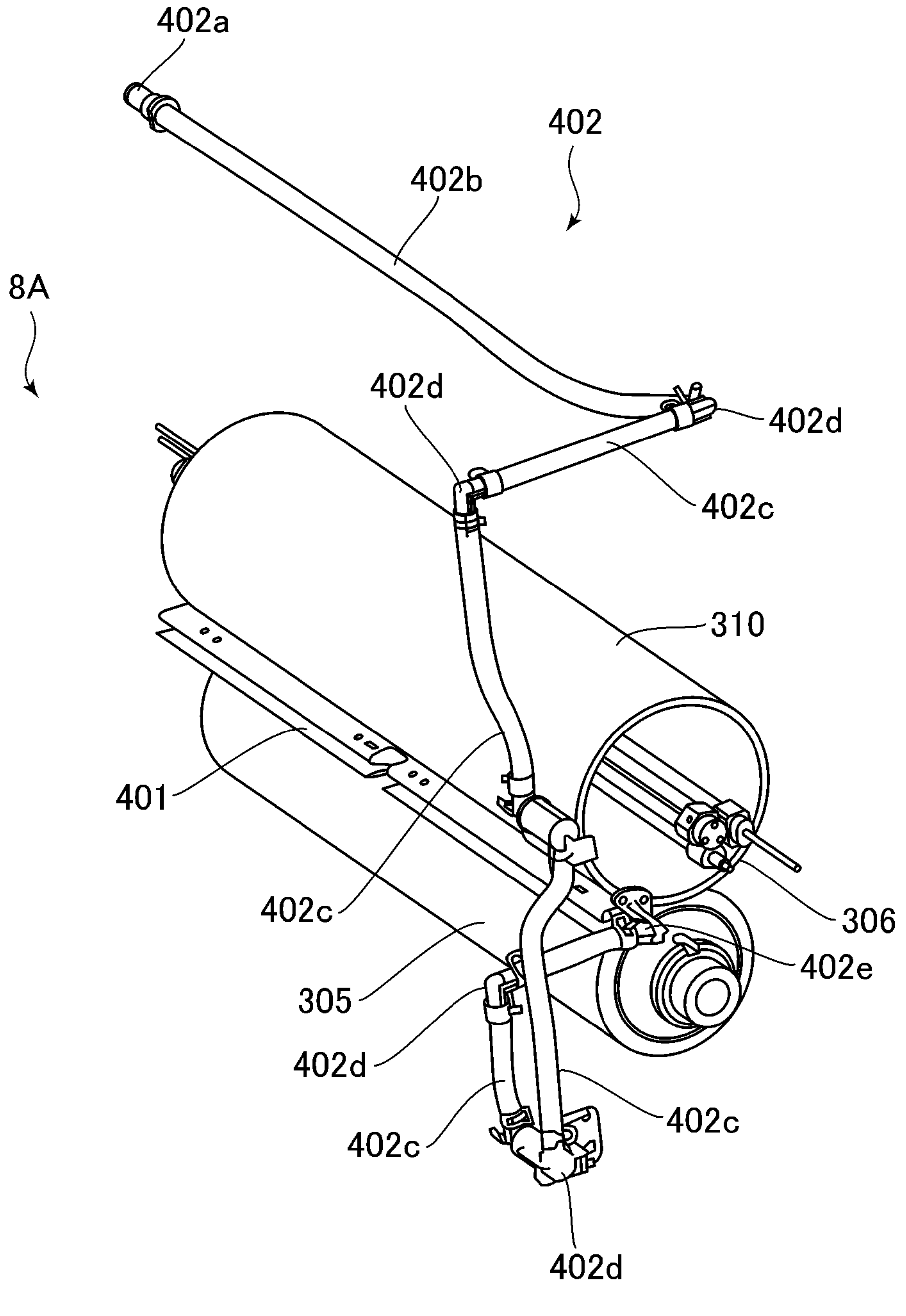

FIG. 9 is a perspective view of the fixing device, an air nozzle, and an air passage in the second embodiment.

Figure 10:
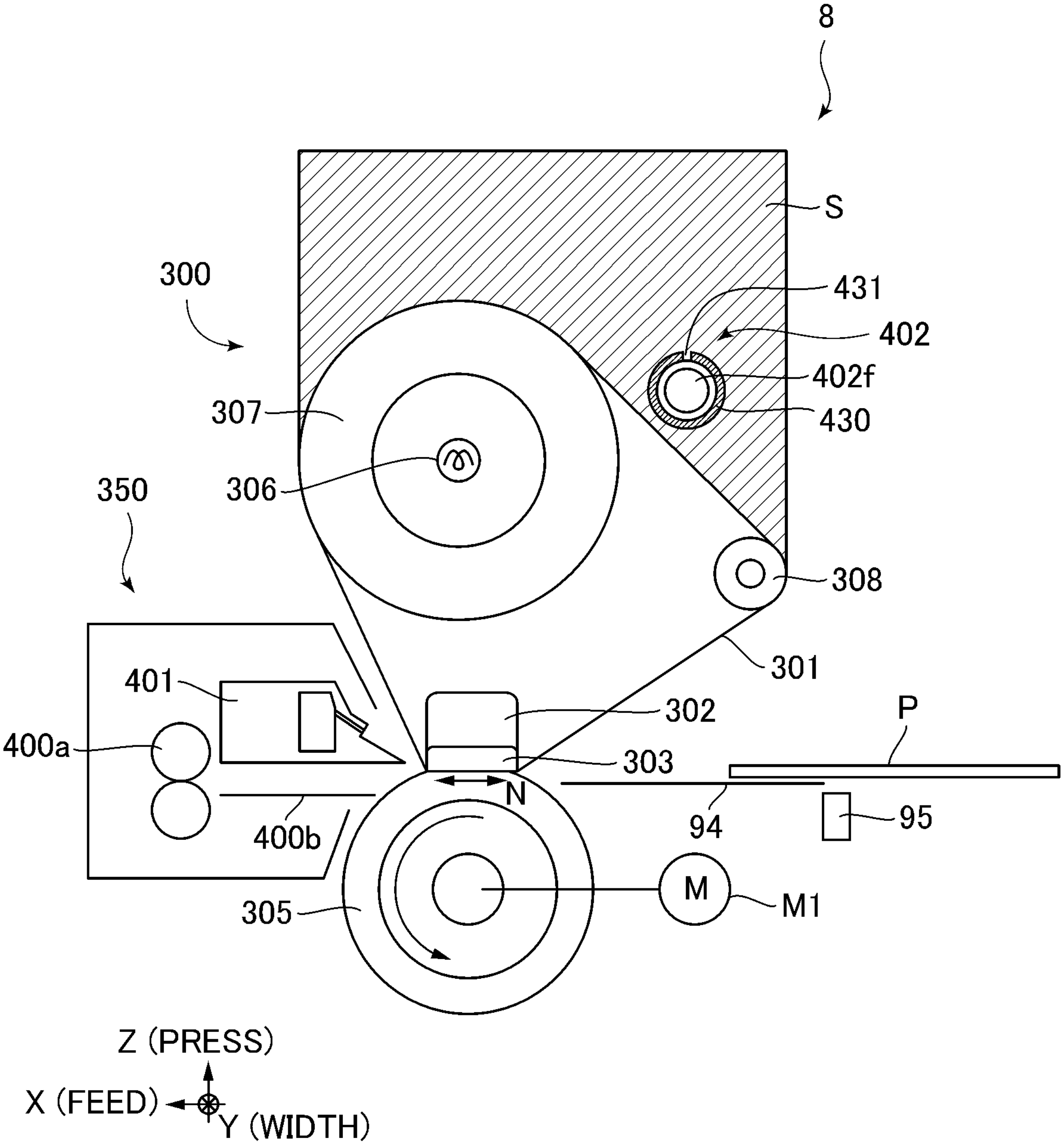

FIG. 10 is a schematic sectional view of a fixing device in a fourth embodiment.

Figure 11:
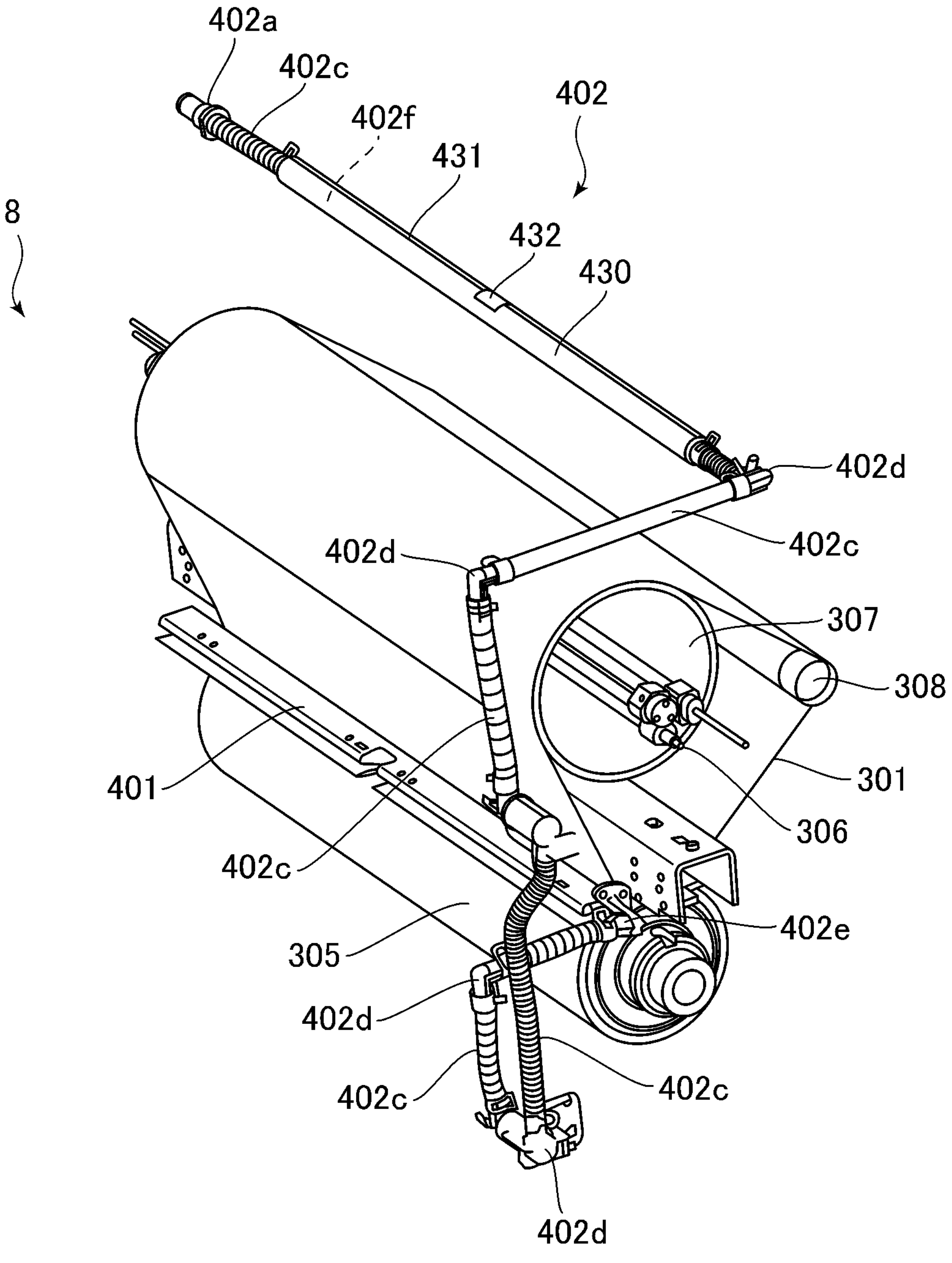

FIG. 11 is a perspective view of the fixing device, an air nozzle, and an air passage in the fourth embodiment.

Figure 12:
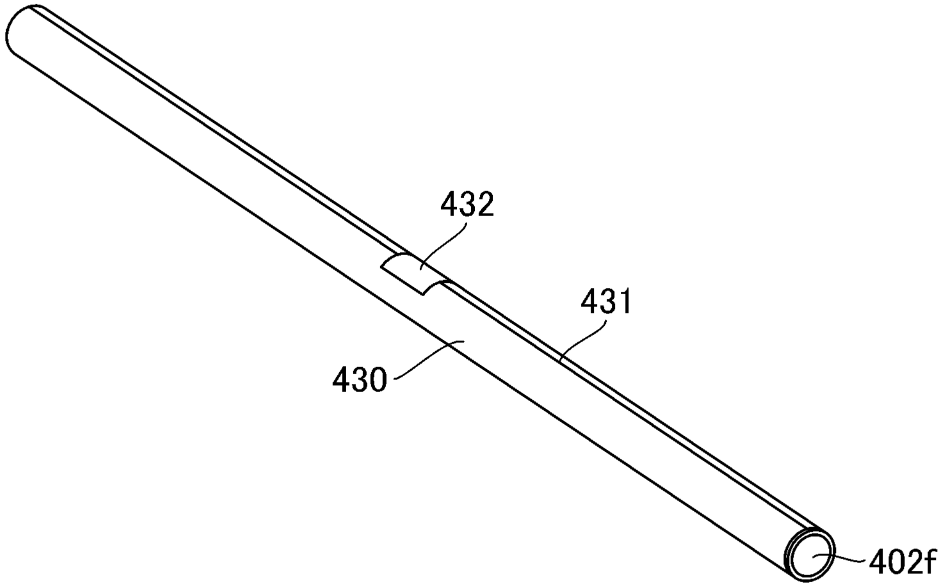
Figure 12:
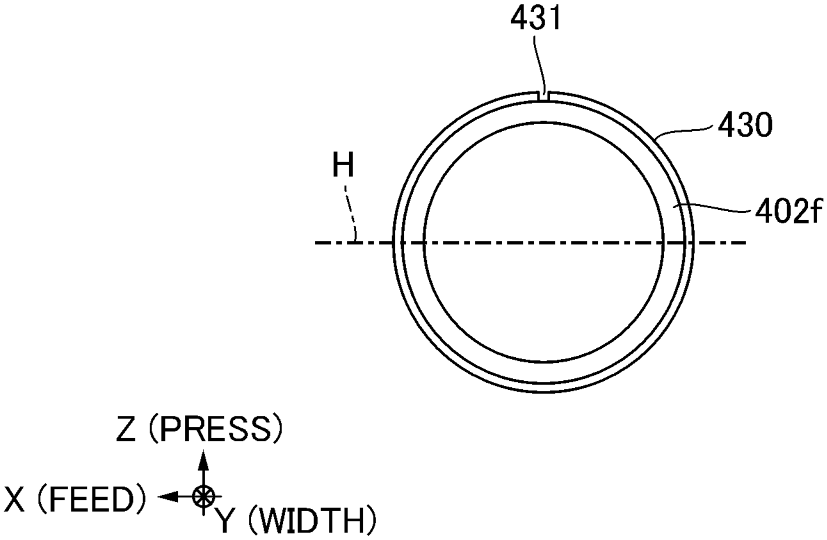

Parts (a) and (b) of FIG. 12 are schematic views of a piping member in the fourth embodiment.

Figure 13:
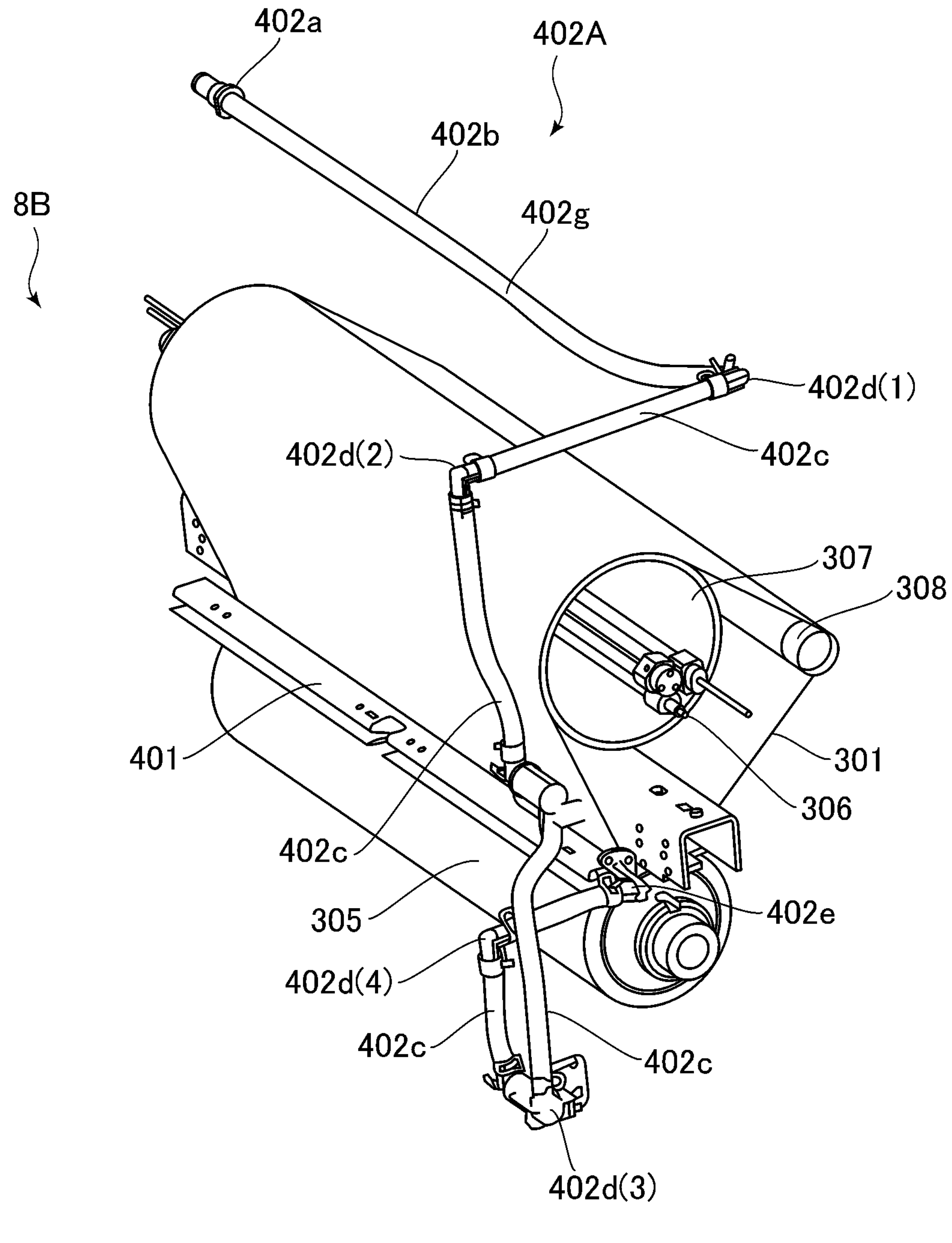

FIG. 13 is a perspective view of a fixing device, an air nozzle, and an air passage in a fifth embodiment.

Figure 14:
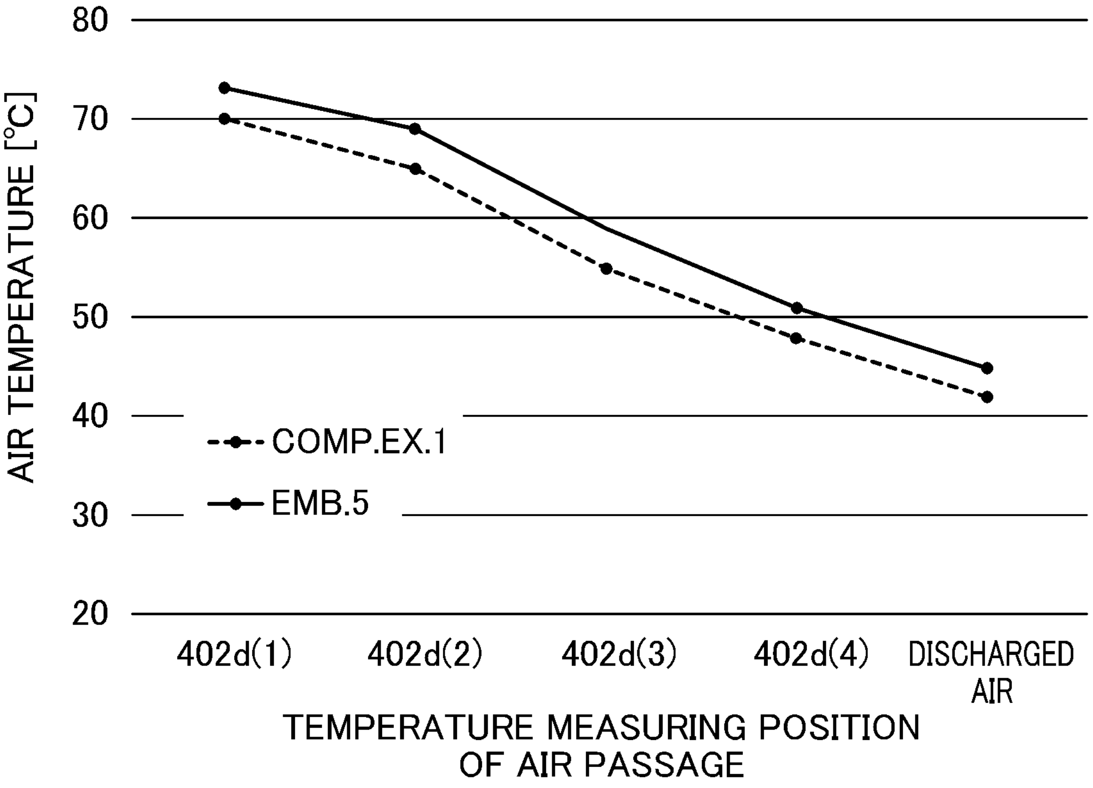

FIG. 14 is a graph showing an effect of the fifth embodiment.

Figure 15:
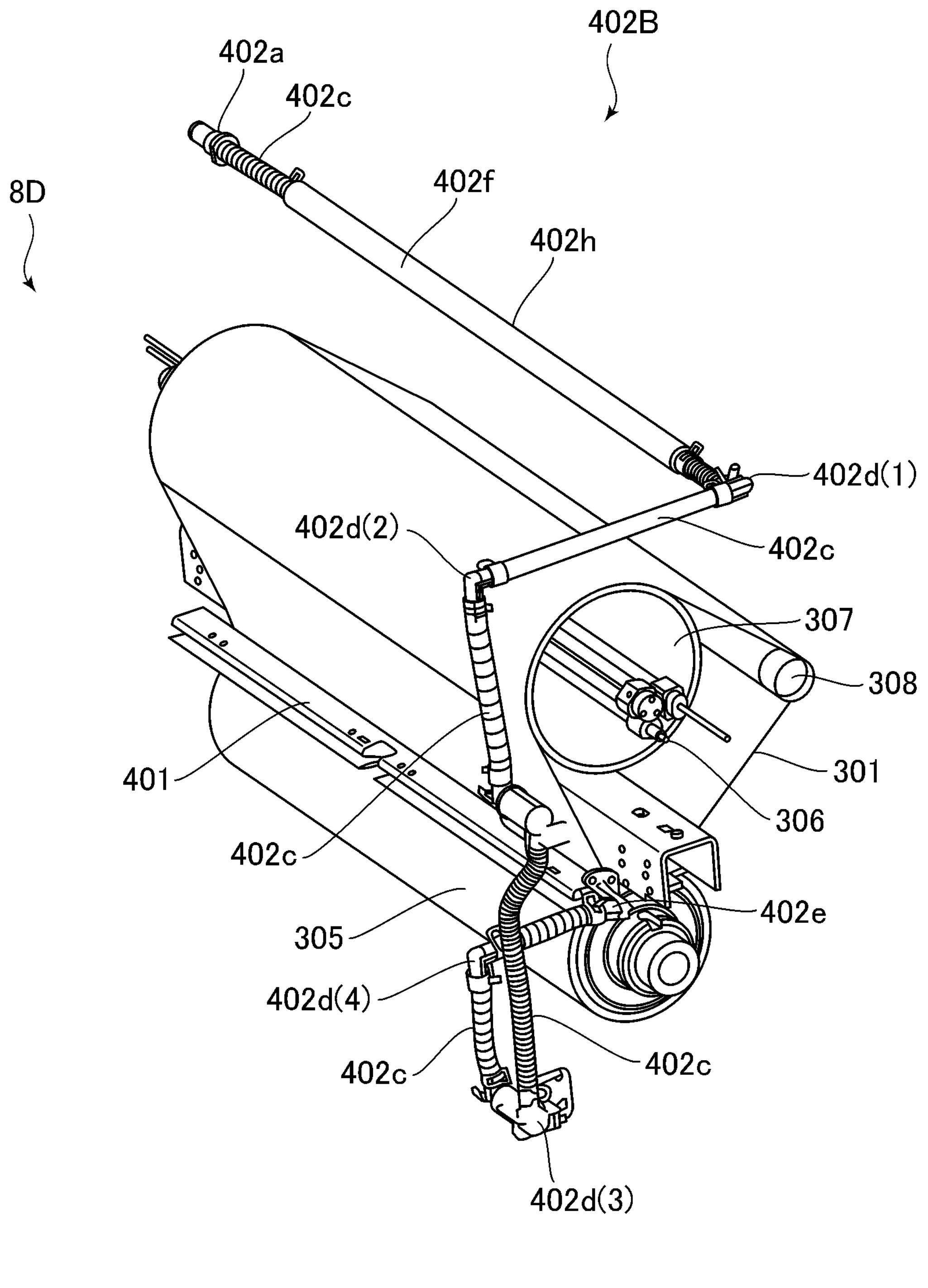

FIG. 15 is a perspective view of a fixing device, an air nozzle, and an air passage in a sixth embodiment.

Figure 16:
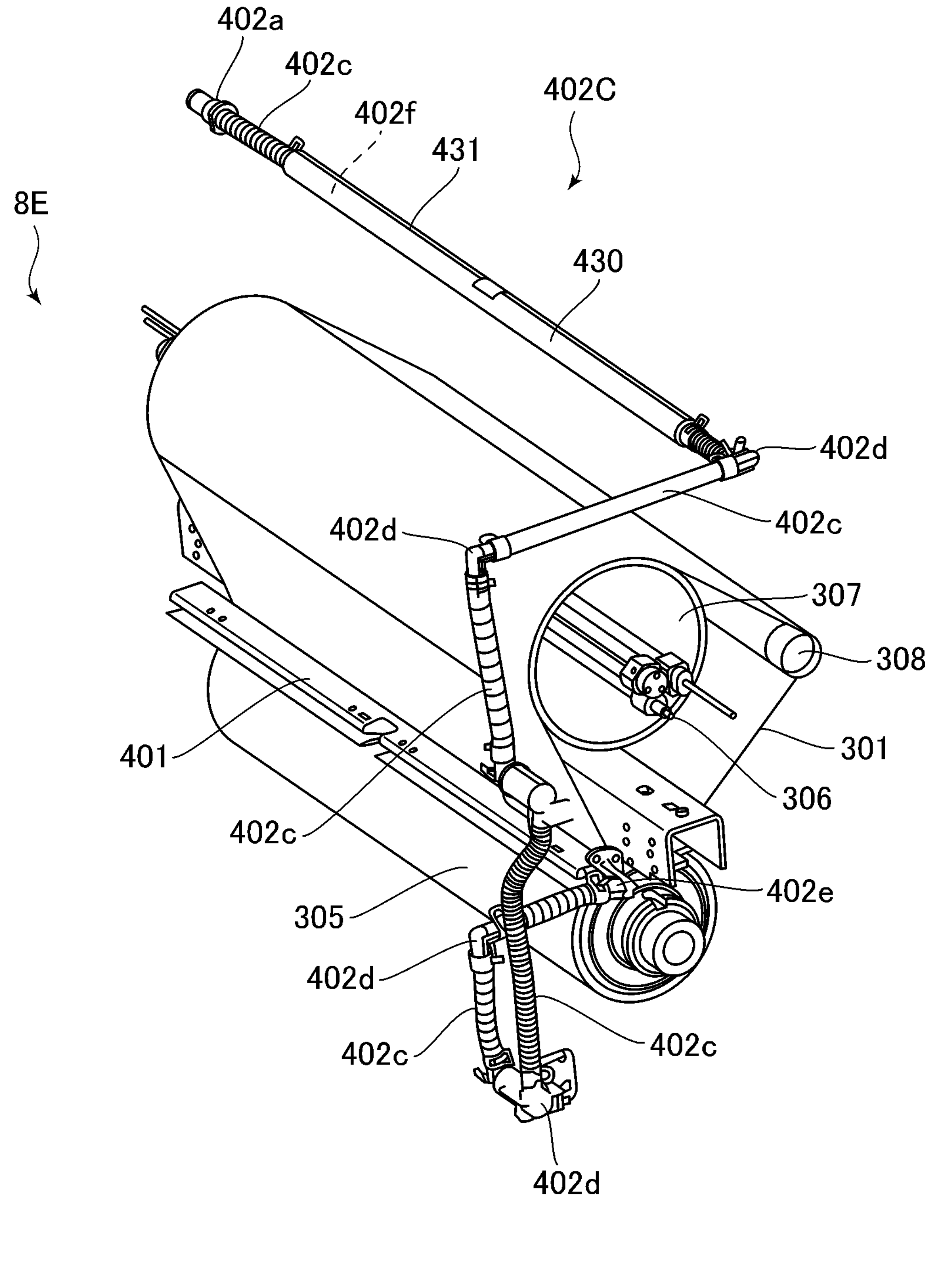

FIG. 16 is a perspective view of a fixing device, an air nozzle, and an air passage in a seventh embodiment.

DESCRIPTION OF THE EMBODIMENTS

First Embodiment

A first embodiment of the present invention will be described using FIGS. 1 to 7. First, a general structure of the image forming apparatus according to this embodiment will be described using FIG. 1.

Image Forming Apparatus

An image forming apparatus 1 is an electrophotographic full-color printer including four image forming portions Pa, Pb, Pc and Pd provided correspondingly to four colors of yellow, magenta, cyan and black. In this embodiment, the image forming apparatus 1 is of a tandem type in which the image forming portions Pa, Pb, Pc and Pd are disposed along a rotational direction of an intermediary transfer belt 204 described later. In this embodiment, the image forming apparatus 1 forms, on a recording material, a toner image (image) depending on an image signal, an image reading portion (original reading device) 2 connected to an image forming apparatus main assembly 3, or from a host device, such as a personal computer, communicatably connected to an image forming apparatus main assembly 3. As the recording material, it is possible to cite a sheet material such as a sheet, a plastic film or a cloth.

The image forming apparatus 1 includes the image reading portion 2 and the image forming apparatus main assembly 3. The image reading portion reads an original placed on an original supporting platen glass 21, and light emitted from a light source 22 is reflected by the original and is formed in an image on a CCD sensor 24 through an optical system member 23 such as a lens. Such an optical system unit converts the original into an electric signal data stream (string) for each of lines by scanning the original with the light in an arrow direction. An image signal obtained by the CCD sensor 24 is sent to the image forming apparatus main assembly 3, and then subjected to image processing for an associated one of the image forming portions by a controller 30 as described later. Further, the controller 30 also receives external input as the image signal from an external host device such as a print server.

The image forming apparatus main assembly 3 include a plurality of image forming portions Pa, Pb, Pc and Pd, and in each of the image forming portions, image formation is carried out on the basis of the above-described image signal. That is, the image signal is converted into a laser beam subjected to PWM (pulse width modulation) control by the controller 30. A polygon scanner 31 as an exposure device scans each of photosensitive drum surfaces with the laser beam. Thus, photosensitive drums 200*a* to 200*d* as image bearing members of the respective image forming portions Pa to Pd are irradiated with the laser beams.

Incidentally Pa is the image forming portion for yellow (Y), Pb is the image forming portion for magenta (M), Pc is the image forming portion for cyan (C) and Pd is the image forming portion for black (Bk), and these portions form images of associated colors. The image forming portions Pa to Pd have the substantially same structure, and therefore, in the following, the image forming portion Pa for Y is described in detail and other image forming portions will be omitted from description. In the image forming portion Pa, on the surface of the photosensitive drum 200*a*, a toner image is formed on the basis of the image signal as described below.

A charging roller 201*a* as a primary charger electrically charges the surface of the photosensitive drum 200*a* to a predetermined potential to prepare for electrostatic latent image formation. An electrostatic latent image is formed on the surface of the photosensitive drum 200*a* charged to the predetermined potential, by irradiation with the laser beam from the polygon scanner 31. A developing device 202*a* develops the electrostatic latent image on the photosensitive drum 200*a*, so that the toner image is formed. A primary transfer roller 203*a* transfers the toner image from the photosensitive drum 200*a* onto the intermediary transfer belt 204 under application of a primary transfer bias of an opposite polarity to a charge polarity of toner by electrically discharging the intermediary transfer belt 204 from a back surface (side). The surface of the photosensitive drum 200*a* after the transfer is cleaned by a cleaner 207*a*.

Further, the toner image on the intermediary transfer belt 204 is fed to a subsequent image forming portion, so that in the order of Y, M, C and Bk, the respective color toner images successively formed in the associated image forming portions are transferred, and thus the four color toner images are formed on the surface of the intermediary transfer belt 204. Then, the toner images passed through the image forming portion Pd for Bk positioned on a most downstream side with respect to a rotational direction of the intermediary transfer belt 204 are fed to a secondary transfer portion constituted by a secondary transfer roller pair 205 and 206. Then, in the secondary transfer portion, the toner images are secondary-transferred from the intermediary transfer belt 204 onto the recording material under application of a secondary transfer electric field of an opposite polarity to the charge polarity of the toner images.

The recording material is accommodated in a cassette 9, and the recording material fed from the cassette 9 is fed to a registration portion 208 constituted by, for example, a pair of registration rollers and awaits at the registration portion 208. Thereafter, the registration portion 208 is subjected to timing control for aligning the toner images on the intermediary transfer belt 204 with the sheet (recording material), and then the recording material is fed to the secondary transfer portion.

The recording material on which the toner images are transferred at the secondary transfer portion is fed to a fixing device 8, in which the toner images are heated and pressed, so that the toner images carried on the recording material are fixed on the recording material. The recording material passed through the fixing device 8 is discharged onto a discharge tray 7. Incidentally, in the case where images are formed on double surfaces (sides) of the recording material, when transfer and fixation of the toner image onto a first surface (front surface) of the recording material are ended, the recording material is turned upside down by being fed through a reverse feeding portion 10, and transfer and fixation of the toner image onto a second surface (back surface) of the recording material are carried out, so that the recording material is stacked on the discharge tray 7.

Incidentally, the controller 30 carries out control of entirety of the image forming apparatus 1 as described above. Further, the controller 30 is capable of making various settings on the basis of input from an operating portion 4 of the image forming apparatus 1. Such a controller 30 includes a CPU (Central Processing Unit), a ROM (Read Only Memory) and a RAM (Random Access Memory). The CPU carries out control of respective portions while reading programs which are stored in the ROM and which correspond to control procedures. Further, in the RAM, operation data and input data are stored, and the CPU carries out the control by making reference to the data stored in the RAM, on the basis of the above-described programs or the like.

Fixing Device

Figure 1:
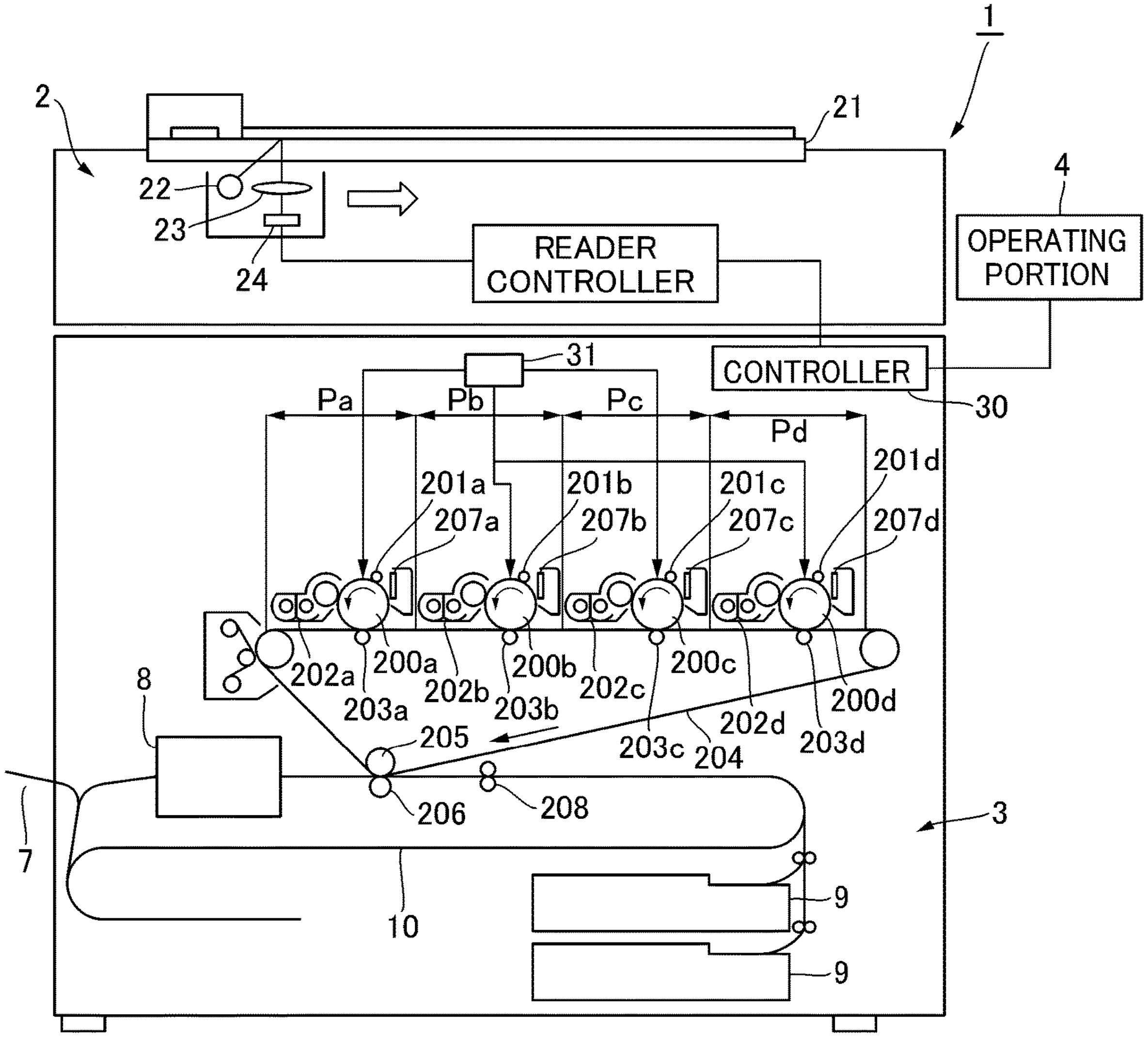
FIG. 1 is a schematic sectional view of an image forming apparatus according to a first embodiment.
Figure 2:
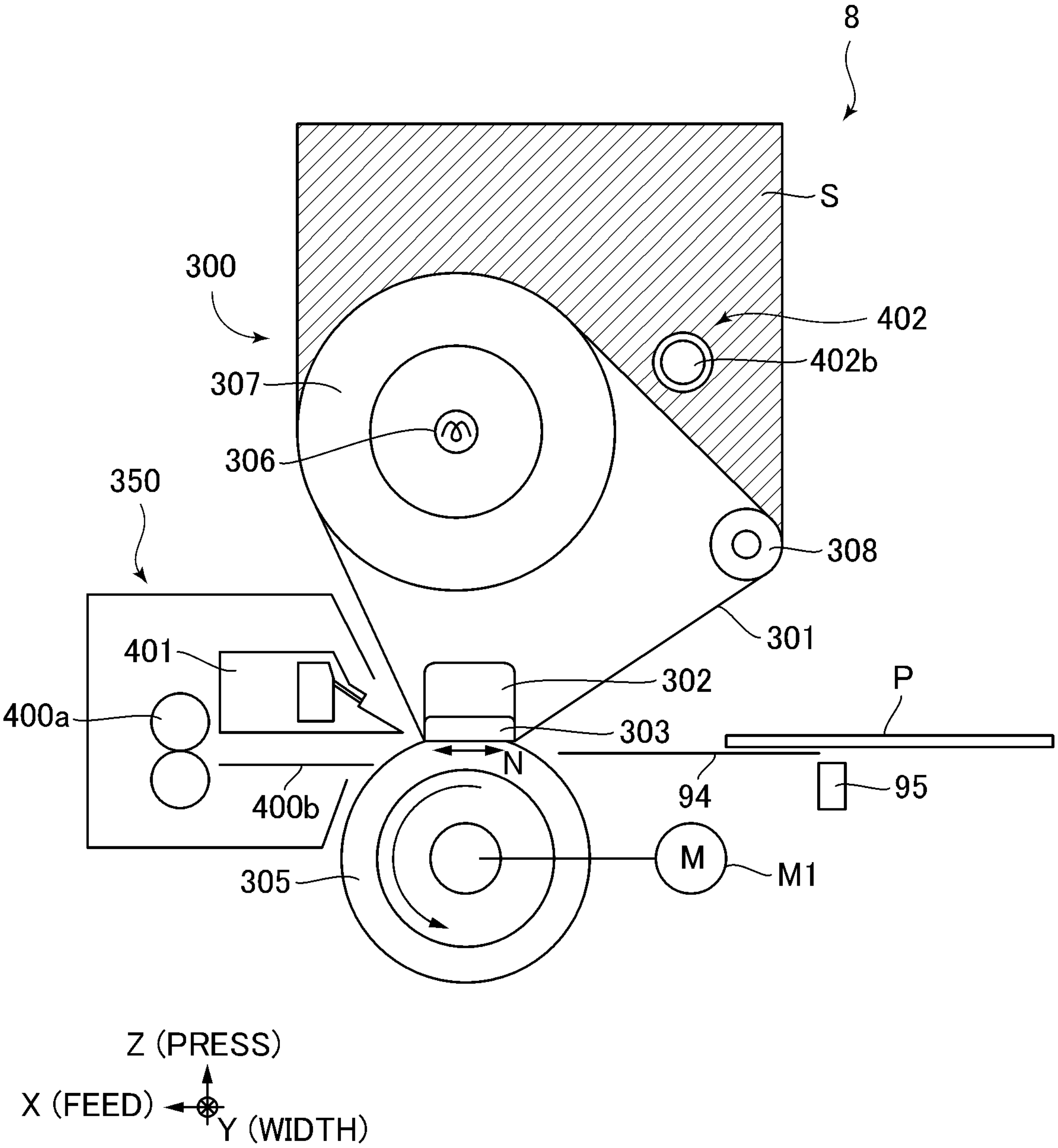
FIG. 2 is a schematic sectional view of a fixing device in the first embodiment.
Figure 3:
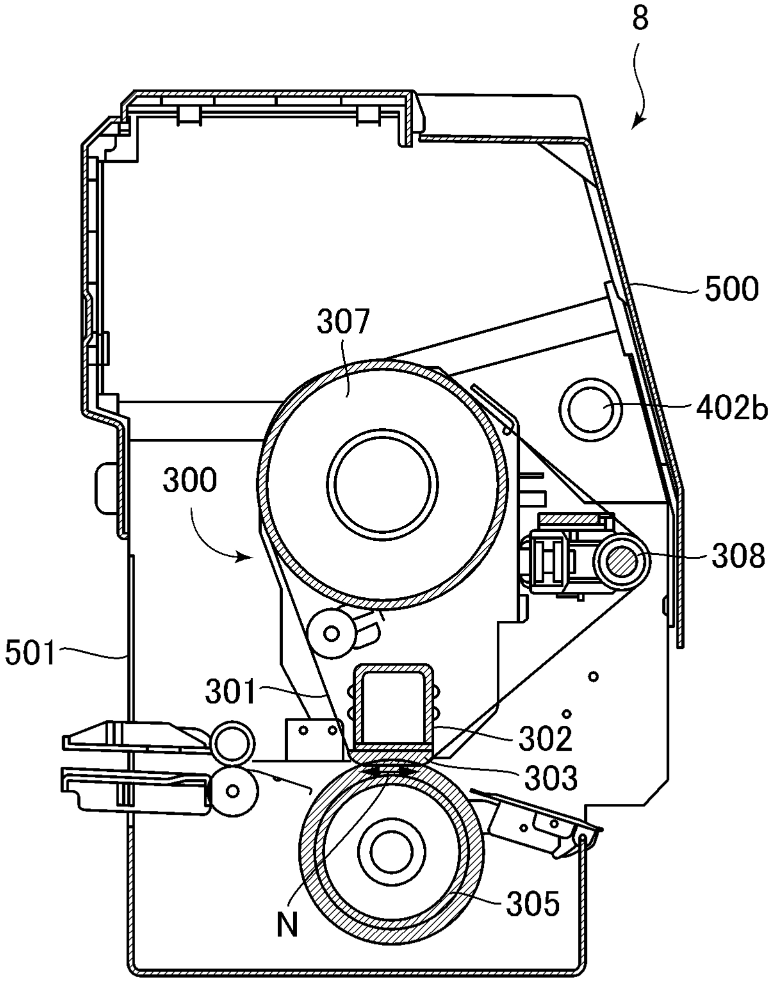
FIG. 3 is a sectional view of the fixing device including a cover in the first embodiment.

Next, a structure of the fixing device 8 in this embodiment will be described using FIGS. 2 and 3. FIG. 2 is a schematic sectional view showing a general structure of the fixing device 8, and FIG. 3 is a sectional view of the fixing device 8 including a cover 500. In this embodiment, a fixing device of a belt heating type using an endless belt is employed. In FIG. 2, X direction is a feeding direction of the recording material P, Y direction is a widthwise direction crossing (in this embodiment, perpendicular to) the feeding direction of the recording material P, and Z direction is a pressing direction of a pressing roller 305. These directions are perpendicular to each other. Further, one side of the widthwise direction (Y direction) is a front side of the image forming apparatus 1, and is, for example, a side where the operating portion 4 is provided, and a user operates the operating portion 4. On the other hand, the other side of the widthwise direction is a rear side of the image forming apparatus 1.

The fixing device 8 includes a heating unit 300 including a fixing belt 301 as an endless rotatable belt and a pressing roller 305 as a nip forming member, contacting the fixing belt 301, for forming a nip in cooperation with the fixing belt 301, and as a rotatable pressing member.

The heating unit 300 includes the above-described fixing belt 301, a fixing pad 303 as a pad member, a heating roller 307, and a steering roller 308. The pressing roller 305 rotates in contact with an outer peripheral surface of the fixing belt 301 and is also rotatable driving member for imparting a driving force to the fixing belt 301.

The fixing belt 301 as a fixing member and a rotatable member has a heat conductive property, a heat resistant property and the like, and has a thin cylindrical shape. In this embodiment, the fixing belt 301 has a three-layer structure consisting of a base layer, an elastic layer formed on an outer peripheral surface of the base layer, and a parting layer formed on an outer peripheral surface of the elastic layer. The base layer is 80 μm in thickness and a polyimide (PI) resin material is used. The elastic layer is 300 μm in thickness and a silicone rubber material is used. The parting layer is 30 μm in thickness and PFA (polytetrafluoroethylene-perfluoroalkoxyethylene copolymer) resin material is used. Such a fixing belt 301 is stretched by the fixing pad 303, the heating roller 307 and the steering roller 308.

The fixing pad 303 is not only disposed inside the fixing belt 301 so as to oppose the pressing roller 305 through the fixing belt 301. The fixing pad 303 forms a nip N in which the recording material is nipped and fed between the fixing belt 301 and the pressing roller 305. In this embodiment, the fixing pad 303 is a substantially plate-like member long along the widthwise direction (a longitudinal direction crossing the rotational direction of the fixing belt 301, rotational axis direction of the heating roller 307) of the fixing belt 301. The fixing pad 303 is pressed against the fixing belt 301 toward the pressing roller 305, so that the nip N is formed. As a material of the fixing pad 303, an LCP (liquid crystal polymer) is used.

The fixing pad 303 is supported by a stay 302, as a supporting member, provided inside the fixing belt 301. That is, the stay 302 is disposed on a side opposite from the pressing roller 305 with respect to the fixing pad 303 and supports the fixing pad 303. Such a stay 302 is a reinforcing member which is long along the longitudinal direction of the fixing belt 301 and which has rigidity. The stay 302 contacts the fixing pad 303 and supports the fixing pad 303. That is, when the fixing pad 303 is pressed by the pressing roller 305, the stay 302 imparts strength to the fixing pad 303 and ensures a pressing force in the nip N.

Between the fixing pad 303 and the fixing belt 301, an unshown lubrication sheet is interposed. Further, onto an inner peripheral surface of the fixing belt 301, a lubricant is applied, so that the fixing belt 301 smoothly slides on the lubrication sheet covering the fixing pad 303. As the lubricant, silicone oil is used.

The heating roller 307 as a first roller is disposed inside the fixing belt 301 and stretches the fixing belt 301 in cooperation with the fixing pad 303 and the steering roller 308. The heating roller 307 is formed of metal such as aluminum or stainless steel in a cylindrical shape, and in which a halogen heater 306 as a heating portion for heating the fixing belt 301 is provided. Further, the heating roller 307 is heated up to a predetermined temperature by the halogen heater 306.

In this embodiment, the heating roller 307 is formed with, for example, a stainless steel pipe of 1 mm in thickness. Further, the halogen heater 306 may also be a single halogen heater, but a plurality of halogen heaters may be used. Incidentally, the heating portion is not limited to the halogen heater, but may also be another heater, such as a carbon heater, capable of heating the heating roller 307. The fixing belt 301 is heated by the heating roller 307 heated by the halogen heater 306 and is controlled at a predetermined target temperature depending on a kind of the recording material, on the basis of temperature detection by an unshown thermistor.

The steering roller 308 is disposed inside the fixing belt 301 and stretches the fixing belt 301 in cooperation with the fixing pad 303 and the heating roller 307, and is rotated by the fixing belt 301. The steering roller 308 is tilted relative to a rotational axis direction (widthwise direction longitudinal direction) of the heating roller 307, and thus controls a position (shift position) of the fixing belt 301 with respect to this rotational axis direction. That is, the steering roller 308 includes a rotation center in the center or on one end side of the steering roller 308 with respect to the rotational axis direction (longitudinal direction) and swings about this rotation center, so that the steering roller 308 tilts with respect to the longitudinal direction of the heating roller 307. By this, a difference in tension is generated between one side and the other side of the fixing belt 301 with respect to the longitudinal direction, so that the fixing belt 301 is moved in the longitudinal direction.

The fixing belt 301 shifts to either one of opposite end portions thereof during rotation due to outer diameter accuracy of the roller for stretching the fixing belt 301 and alignment accuracy between the respective rollers. For this reason, the shift of the fixing belt 301 is controlled by the steering roller 308. Incidentally, the steering roller 308 may also be swung by a driving source such as a motor, or a constitution in which the fixing belt 301 is swung by self-alignment may also be employed.

Further, in the case of this embodiment, the steering roller 308 is also tension roller which is urged by a spring supported by a frame of the heating unit 300 and which imparts predetermined tension to the fixing belt 301. Further, the steering roller 308 is formed in a cylindrical shape by metal such as aluminum or stainless steel. In this embodiment, the steering roller 308 is a stainless steel pipe which is 20 mm in outer diameter. The steering roller 308 may also be provided with a rubber material at a surface thereof in order to enhance a gripping force.

The pressing roller 305 rotates in contact with the outer peripheral surface of the fixing belt 301 and imparts a driving force to the fixing belt 301. In this embodiment, the pressing roller 305 is a roller prepared by forming an elastic layer on an outer peripheral surface of a shaft and then by forming a parting layer on an outer peripheral surface of the elastic layer. The shaft is formed of stainless steel of 72 mm in diameter. The elastic layer is formed in a thickness of 8 mm with an electroconductive silicone rubber. The parting layer is formed in a thickness of 100 μm with PFA (tetrafluoroethylene-perfluoroalkoxyethylene copolymer) as a fluorine-containing resin material. The pressing roller 305 is supported by a fixing frame (not shown) of the fixing device 8 so as to be rotatable, and to one end portion thereof, a gear is fixed. The pressing roller 305 is connected to a motor M as a pressing roller driving source and is rotationally driven.

The thus-constituted fixing device 8 heats the toner image while nipping and feeding the toner image-carrying recording material P in the nip N formed between the fixing belt 301 and the pressing roller 305. Then, the toner image is fixed on the recording material P. Therefore, the fixing device 8 is required to compatibly realize a function of applying heat and pressure and a function of feeding the recording material P. The pressing roller 305 is pressed against the fixing belt 301 toward the fixing pad 303 by an unshown driving source. In this embodiment, a pressing force (NF) in the nip N during image formation is 1600N, and setting was made so that a length of the nip N in the X direction (feeding direction) was 24.5 mm, and a length of the nip N in the Y direction (widthwise direction) was 326 mm.

Further, on a side downstream of the nip N with respect to the feeding direction of the recording material P, a discharging unit 350 for discharging the recording material P, passed through the nip N, to an outside of the fixing device 8. In the discharging unit 350, an air nozzle 401, a discharging roller pair 400*a*, and a lower separating guide 400 are provided. The air nozzle 401 as a nozzle blows air (compressed air) for peeling off the recording material P from the fixing belt 301. Specifically, the air nozzle 401 is disposed downstream of the nip N with respect to the feeding direction of the recording material P (hereinafter, simply referred to as a "feeding direction") and above the nip N with respect to the vertical direction, and blows air toward an upstream side of the feeding direction and blow the nip with respect to the vertical direction. Then, the recording material P is peeled off from the fixing belt 301 by blowing the air to a neighborhood of a leading end of the recording material P after passing through the nip N.

The lower separation guide 400*b* is disposed on a side downstream of the nip with respect to the recording material feeding direction and below the nip N with respect to the vertical direction, so that a tip thereof is close to and opposes the neighborhood of the nip N of the pressing roller 305. Then, in the case where the recording material P is stuck to the pressing roller 305, the lower separation guide 400 peels off the recording material P from the pressing roller 305. Further, the lower separation guide 400*b* supports a lower surface of the recording material P discharged from the nip N, and guides this recording material P to the discharging roller pair 400*a*. The discharging roller pair 400*a* discharges the recording material P, discharged from the nip N, to an outside of the fixing device 8. In this embodiment, the discharging roller pair 400*a* is disposed on a side downstream of the nip N by about 40 mm with respect to the feeding direction.

Further, on a side upstream of the nip N of the fixing device 8 with respect to the feeding direction, a guiding portion 94 for guiding the recording material P to the nip N, and a detecting sensor 95 for detecting the recording material P immediately in front of the nip N are provided. The controller 30 causes the detecting sensor 95 to detect a timing when the recording material P enters the nip N.

Further, the fixing device 8 includes, as shown in FIG. 3, a cover 500 for covering at least above the fixing belt 301 with respect to the vertical direction. In this embodiment, the cover 500 is disposed so as to cover a part of a periphery including an upper part of the fixing belt 301 and a part of an air passage 402 described later. Such a cover 500 constitutes a part of a casing 501 of the fixing device 8 in which the heating unit 300, the pressing roller 305, and the discharging unit 350 are accommodated.

Air Nozzle and Air Passage

Figure 4:
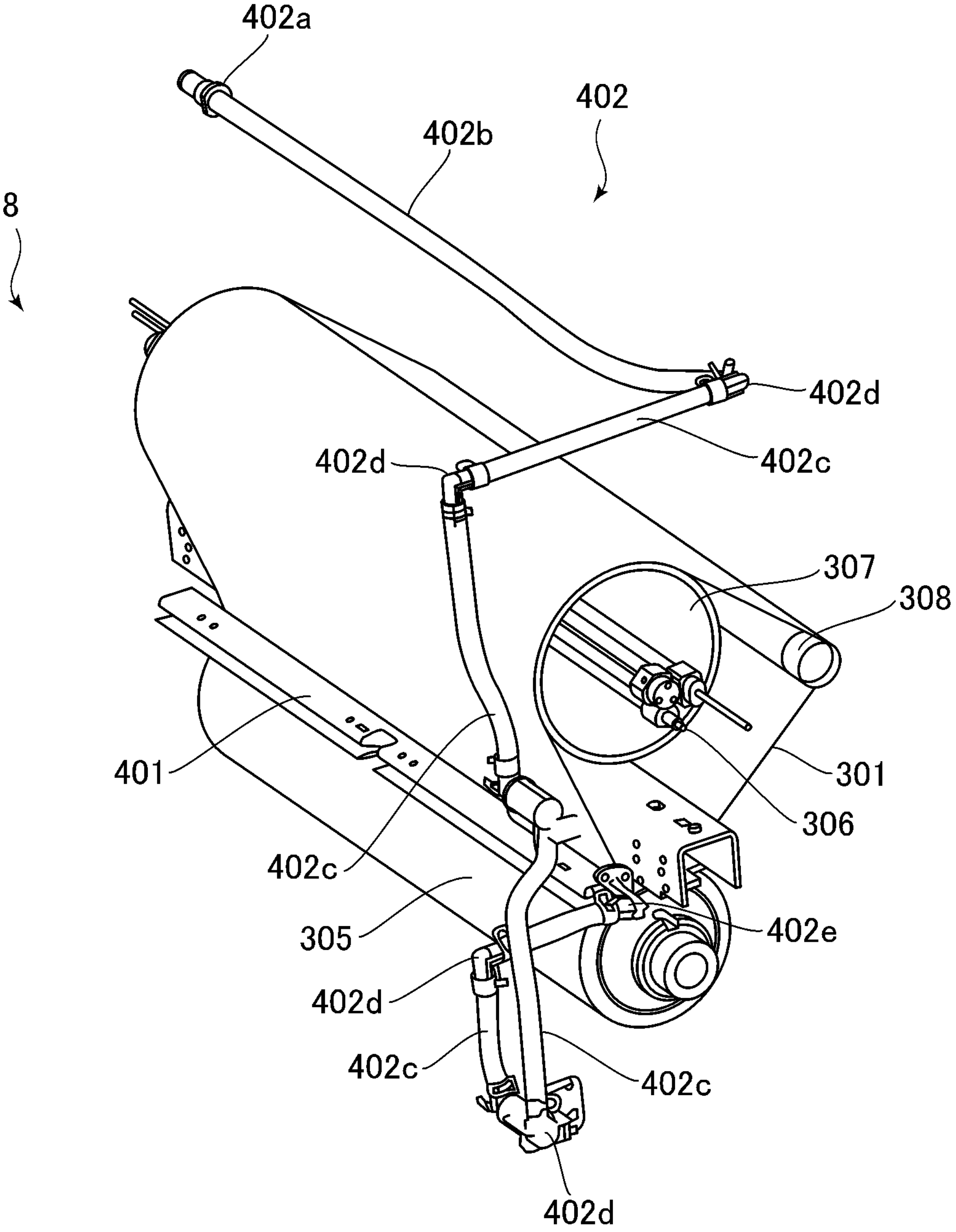
FIG. 4 is a perspective view of the fixing device, an air nozzle, and an air passage in the first embodiment.

Next, the air nozzle 401 and the air passage 402 will be specifically described using FIGS. 4 to 6 while making reference to FIG. 3. The air nozzle 401 is a member, made of an aluminum alloy, disposed opposed to the fixing belt 301 so that a longitudinal direction thereof if a direction along the widthwise direction of the fixing belt 301 as shown in FIG. 4. The air nozzle 401 is provided with about 30 to 50 nozzle holes 401*a* each of about 0.5 to 1.0 mm in diameter, which open at a surface thereof opposing the fixing belt 301 as shown in parts (a) and (b) of FIG. 5. Then, compressed air generated by an air compressor 96*a* passes through the air passage 402 and is guided to a space inside the air nozzle 401 through an air nozzle inlet opening 401*b* provided in the air nozzle 401, so that the compressed air is discharged from the nozzle holes 401*a*. The air nozzle inlet opening 401*b* opens at one end portion of the air nozzle 401 with respect to the longitudinal direction of the air nozzle 401.

The air passage 402 as a flow passage member is disposed inside the casing 501 of the fixing device 8 as shown in FIGS. 4 and 6. The air passage 402 includes, as shown in FIG. 4, a fixing-side coupler 402*a*, a piping member (air heating portion) 402*b*, an air tube 402*c*, a tube joint 402*d*, an air pipe 402*e*, and the like.

The fixing-side coupler 402*a* is provided at an entrance of the air passage 402 and is a coupling member for piping detachably mountable to a main assembly-side coupler 96*f* described later in order to supply the compressed air, supplied from the air compressor 96*a* described later, into the air passage 402. The piping member 402*b* as a part of the flow passage member is provided with the fixing-side coupler 402*a* mounted thereto at one end portion thereof. At the other end portion of the piping member 402*b*, a plurality of tube joints 402*c* and a plurality of air tubes 402*c* are connected, so that the air passage 402 which is a series of air flow passages is formed. On a most downstream side of the air passage 402, the air pipe 402*e* is mounted to the air passage 402 and is connected to the air nozzle inlet opening 401*b* provided in the air nozzle 401. The thus-constituted air passage 402 guides the compressed air, caused to flow from the fixing-side coupler 402*a*, to a space inside the air nozzle 401 through the piping members 402*b* and the air tubes 402*c*. The piping member 402*b* in this embodiment is made of metal. In some embodiments, piping member 402*b* may be formed of a heat resistant material such as silicone rubber, and a surface thereof may also be made of metal.

Each of the piping members 402*b* and the air tubes 402*c* is about φ9 mm in inner diameter and about 1 mm in thickness, and air tubes 402*c* formed of a heat-resistant material such as a silicone rubber, for example. The tube joint 402*d* is formed of, for example, an aluminum alloy or a heat-resistant resin. The tube joint 402*d* is a component part for bending the flow passage, and is disposed between the piping member 402*b* and the air tube 402*c* or between two air tubes 402*c*, so that the piping member 402*b* and the air tube 402*c* can be extended in various directions without being bent and buckled.

FIG. 6 is a schematic view of a passage from the air compressor 96*a* to the air nozzle 401 inside the image forming apparatus 1 as viewed from above. Inside the image forming apparatus main assembly 3 of the image forming apparatus 1, the air compressor 96*a*, a piping tube 96*g*, a pressure releasing electromagnetic valve 96*b*, a pressure adjusting valve 96*c*, an air filter 96*d*, a blowing electromagnetic valve 96*e*, the main assembly-side coupler 96*f*, and the like are provided.

The air compressor 96*a* generates the compressed air. The piping tube 96*g* connects the air compressor 96*a* with the air passage 402 provided inside the casing 501 of the fixing device 8. The pressure releasing electromagnetic valve 96*b* is used to release the pressure in the piping tube 96*g*. The pressure adjusting valve 96*c* adjusts and maintain the pressure in the piping tube 96*g* to predetermined pressure. The air filter 96*d* separates and removes a drain, dust, and waste in the piping tube 96*g*. The blowing electromagnetic valve 96*e* is a valve for performing an operation for blowing the compressed air to a leading end of the recording material P by sending the compressed air into the air nozzles 401. The main assembly-side coupler 96*f* is a coupling member connected to the fixing-side coupler 402*a*. By such a constitution, the air generated by the air compressor 96*a* and passed through the piping tube 96*g* is supplied to the above-described air passage 402.

The air blowing operation is performed in the following manner. First, after the air compressor 96*a* is started up, the pressure releasing electromagnetic valve 96*b* is closed, so that the compressed air with a pressure adjusted by the pressure adjusting valve 96*c* is accumulated inside the piping tube 96*g* to the blowing electromagnetic valve 96*e*. In this embodiment, the pressure adjusting valve 96*c* is adjusted so that the pressure in the piping tube 96*g* becomes 0.2 to 0.3 MPa.

When the recording material P is sent to the fixing device 8, the detecting sensor 95 detects the leading end of the recording material P. On the basis of a timing at that time, after a lapse of a predetermined time, the blowing electromagnetic valve 96*e* is opened, so that the compressed air accumulated in the piping tube 96*g* is blown to the leading end of the recording material P and thus the recording material P is peeled off from the fixing belt 301.

Such blowing of the compressed air is carried out in a range of about 90 mm from the leading end of the recording material P. That is, in a period in which the recording material P of which leading end passed through the nip N is separated from the fixing belt 301 by about 90 mm, i.e., in a period in which the leading end of the recording material P moves about 90 mm from an exit of the nip N, the air blowing form the air nozzle 401 is performed. This is because there is a liability that air pressure in the piping tube 96*g* cannot be sufficiently increased until separation of a subsequent recording material when the blowing period is long and that the recording material cannot be sufficiently separated when the blowing period is short.

For example, in the case where a length of separation of the recording material P from the fixing belt 301 is 150 mm or more, the air is continuously blown from the air nozzles 401 for a longer time than in the case where the length of the separation is 90 mm, so that there is a liability that a time when the air is compressed for separating a subsequent recording material from the fixing belt 301 is not enough. This length of 150 mm is a length of a minimum-size recording material with respect to the feeding direction on which the image is capable of being formed by the image forming apparatus 1. On the other hand, for example, in the case where the length in which the recording material P is separated from the fixing belt 301 is 40 mm, separating power becomes in sufficient. This length of 40 mm is a length from the exit of the nip N to the discharging roller pair 400*a*. In this embodiment, by blowing the air from the air nozzles 401 until the recording material P is nipped by the discharging roller pair 400*a*, it is possible to suppress that an intermediary portion of the recording material P with respect to the feeding direction is wound about the fixing belt 301. From the above, in this embodiment, the length in which the recording material P is separated from the fixing belt 301 was set at 90 mm which is an intermediary length between these lengths of 150 mm and 40 mm.

Position of Piping Member

Next, a position of the piping member 402*b* which is a part of the air passage 402 will be described with reference to FIGS. 2 to 4. As described above, in this embodiment, the recording material P is peeled off from the fixing belt 301 by blowing the air from the air nozzles 401. Here, when a temperature of the blown air is low, the toner image on the recording material is cooled in some cases. The cooled toner image changes in glossiness depending on a cooling temperature, and therefore, there is a liability that the toner image causes uneven glossiness.

Particularly, in this embodiment, the air nozzle 401 is disposed so that the longitudinal direction thereof extends along the widthwise direction of the fixing belt 301, and is provided with a plurality of nozzle holes 401*a* formed in the surface opposing the fixing belt 301. In addition, by providing the plurality of nozzle holes 401*a* each having a small diameter in such a manner, the compressed air with a high air (wind) pressure and a large air volume is blown to the recording material.

On the other hand, the toner image on the recording material to which the compressed air is blown is abruptly cooled in the case where the air low in temperature is blown to the recording material. The air pressure and the air volume become higher (larger) as the toner image is closer to the nozzle holes 401*a* with respect to the widthwise direction. That is, the toner image on the recording material has a temperature distribution by cooling of the compressed air depending on positions of the nozzle holes 401*a* with respect to the widthwise direction. The cooled toner image slightly changes in glossiness depending on the cooling temperature and has a glossiness distribution with respect to the widthwise direction.

With speed-up of apparatus and diversification of media such as ultra-thin paper is recent years, in order to further enhance a peeling performance, measures such that the air nozzles 401 are further brought near to the fixing belt 301 and that the air pressure of the compressed air is increased are taken. In the case where such measures are taken, the temperature distribution of the toner image on the recording material becomes larger. As a result, the glossiness distribution depending on the temperature distribution occurs at a visually recognizable level (this phenomenon is referred to as uneven nozzle pitch). Therefore, in this embodiment, the piping member 402*b* which is a part of the air passage 402 is disposed in the following manner, so that the air blown from the air nozzles 401 is heated and thus the above-described uneven glossiness of the toner image is suppressed.

The piping member 402*b* is disposed above the fixing belt 301 with respect to the vertical direction and in a range overlapping with the fixing belt 301 in the case where the fixing belt 301 is viewed from above. In other words, the piping member 402*b* is disposed, as shown in FIG. 2, in a silhouette S where an upper-side surface of the fixing belt 301 is projected above. Further, the piping member 402*b* is disposed, as shown in FIG. 3, between the fixing belt 301 and the cover 500. Incidentally, the piping member 402*b* and the fixing belt 301 may preferably oppose each other with no obstructing material. However, the piping member 402*b* may be covered with a nonwoven fabric or the like, and between the piping member 402*b* and the fixing belt 301, for example, a member, such as a frame of the fixing device 8 or the like, shielding a part of a portion between the piping member 402 and the fixing belt 301 may be provided. In the case where this shielding member is provided, it is preferable that a shielding area is small. In summary, in this embodiment, the piping member 402*b* may only be required to be disposed above the fixing belt 301 so that the piping member 402*b* is heated by heat generated from the fixing belt 301.

Further, the piping member 402*b* is disposed, as shown in FIG. 4, along the widthwise direction crossing the recording material embodiment direction. In this embodiment, the piping member 402*b* is disposed substantially in parallel to the longitudinal direction of the fixing belt 301. Specifically, the piping member 402*b* is disposed in the cover 500 of the fixing device 8 along the widthwise direction (Y direction) from a rear side toward a front side of the image forming apparatus 1. By this, a length in which the piping member 402*b* opposes the fixing belt 301 can be made longer than in the case where for example, the piping member 402*b* is disposed in parallel to the recording material feeding direction, so that the air passing through the piping member 402*b* can be efficiently heated by heat of the fixing belt 301.

A length of the piping member 402*b* may preferably be shorter than a length of the fixing belt 301 in the longitudinal direction, and may preferably be disposed so that entirety of the piping member 402*b* falls within a range overlapping with the fixing belt 301 in the case where the fixing belt 301 is viewed from above. This is because in the case where a part of the piping member 402*b* is out of the range overlapping with the fixing belt 301, there is a liability that the air is cooled at the part.

The piping member 402*b* is positioned, as shown in FIG. 2, on a downstream side of the rotational direction of the fixing belt 301 than a highest position of the fixing belt 301 with respect to the vertical direction is. By this, the air warmed at a periphery of the fixing belt 301 and flowing along the rotational direction of the fixing belt 301 blows against the piping member 402*b*, so that the piping member 402*b* is efficiently heated.

Particularly, in this embodiment, the fixing belt 301 is, as described above, stretched by the fixing pad 303, the heating roller 307, and the steering roller 308. Further, of these stretching members, the heating roller 307 as a first roller is positioned at a highest position. The steering roller 308 as a second roller is disposed downstream of the heating roller 307 and upstream of the nip N (i.e., the fixing pad 303) with respect to the rotational direction of the fixing belt 301. Further, the piping member 402*b* is disposed between the heating roller 307 and the steering roller 308 with respect to the rotational direction of the fixing belt 301. For this reason, it becomes possible that the air heated by the heating roller 307 is efficiently sent to the piping member 402*b* side by the rotation of the fixing belt 301.

Further, in this embodiment, the steering roller 308 is positioned below the highest position (top) of the heating roller 307, and the piping member 402*b* is positioned between the heating roller 307 and the steering roller 308 with respect to the rotational direction of the fixing belt 301. For this reason, the piping member 402*b* can be disposed at the same highest as the top of the heating roller 307 or below the top of the heating roller 307. As a result, even when the piping member 402*b* is disposed above the fixing belt 301, it is possible to suppress that the piping member 402*b* protrudes above the highest position of the fixing belt 301, so that upsizing of the apparatus can be suppressed.

In the case of the thus-constituted this embodiment, in a constitution in which the recording material is peeled off from the fixing belt 301 by blowing the air to the recording material, it is possible to suppress occurrence of uneven glossiness on the toner image. That is, in the case of this embodiment, the piping member 402*b* which is a part of the air passage 402 is disposed above the fixing belt 301. For this reason, the air heated by radiant heat of the fixing belt 301 is raised, so that the piping member 402*b* is heated by this air. In the case of this embodiment, during operation of the image forming apparatus 1, the piping member 402*b* is heated to about 80 to 100° C. by the heat from the fixing belt 301. Then, the air flowing inside the piping member 402*b* is also heated, so that it is possible to blow warm air from the air nozzles 401 toward the recording material. As a result, a temperature distribution generated by the air blown from the air nozzles 401 can be made small, so that the occurrence of the uneven glossiness can be suppressed.

Embodiment

An experiment conducted for confirming an effect of the above-described constitution of this embodiment will be described.

In the experiment, a temperature distribution on the recording material in the case where the air is blown from the air nozzles 401 to the recording material was measured in each of an embodiment in which the piping member 402*b* is disposed above the fixing belt 301 as in the above-described this embodiment and a comparison example in which the piping member 402*b* is not disposed above the fixing belt 301.

In the embodiment, the compressed air ejected from the air nozzle 401 passes through the piping member 402*b* heated to about 80 to 100° C., and thus is heated up to about 60 to 70° C. Further, the compressed air is somewhat cooled by passing through the air tube 402*c* and the tube joint 402*d* which are positioned downstream of the piping member 402*b*, and thus the temperature of the compressed air lowers to about 42° C., so that the compressed air is guided to an inside space of the air nozzle 401 through the air nozzle inlet opening 401*b*. On the other hand, in the case where the portion heated by the fixing belt 301 is not provided in the air passage 402 as in the comparison example, into the air nozzles 401, the compressed air of about 30° C. is guided.

FIG. 7 shows a temperature distribution on the recording material P immediately after the compressed air is blown onto the recording material P in each of the embodiment and the comparison example. As shown in FIG. 7, with a distance closer to a position of an associated nozzle hole 401*a* of the air nozzle 401, a larger degree of a lowering in temperature of the recording material P occurred. As in the comparison example, in the case where a compressed air temperature ("C.A.T.") of the compressed air guided to the air nozzle 401 was 30° C., a different ΔT between a maximum temperature portion and a minimum temperature position which are adjacent to each other was 19.0° C. at the maximum. On the other hand, in the case of the embodiment, the compressed air temperature ("C.A.T.") of the compressed air guided to the air nozzle 401 was 42° C., and ΔT was 9.3° C. at the maximum. Thus, as is apparent from FIG. 7, in this embodiment, a glossiness distribution generated on the toner image on the recording material P is suppressed, so that a level of uneven nozzle pitch can be improved to a visually unrecognizable level.

Second Embodiment

A second embodiment will be described using FIGS. 8 and 9. In the above-described first embodiment, the case where the fixing member is the fixing belt 301 was described. On the other hand, in this embodiment, the fixing member was changed to a fixing roller 310. Other constitutions and actions are similar to those in the first embodiment and therefore, similar constitutions are represented by the same reference numerals or symbols and are omitted from description and illustration or briefly described. In the following a difference from the first embodiment will be principally described.

A fixing device 8A in this embodiment includes the fixing roller 310 as the fixing member and as a rotatable heating member, and the fixing roller 310 forms a nip N in press-contact with the pressing roller 305.

The fixing roller 310 includes a core metal which is, for example, 77 mm in outer diameter, 6 mm in thickness, and 350 mm in length and which is made of a cylindrical metal (aluminum in this embodiment). On the core metal, as a heat-resistant elastic layer, a silicone rubber (JIS-A hardness of 20 degrees in this embodiment) is coated in a thickness of 1.5 mm. On the elastic layer, in order to improve a parting property from the toner, as a heat-resistant parting layer, a fluorine-containing resin material (PFA tube in this embodiment) is coated in a thickness of 50 μm.

The fixing roller 310 is rotatably supported by an unshown frame of the fixing device 8A, and is configured so as to be rotationally driven at a predetermined peripheral speed by an unshown driving source. Further, inside the fixing roller 310, a halogen heater 306 as a heating portion is provided, and the halogen heater 306 is capable of generating heat up to a predetermined temperature.

The air nozzle 401 and the air passage in this embodiment are similar to those in the first embodiment.

Further, also, in the case of this embodiment, the piping member 402*b* as a part of the air passage 402 is disposed above the fixing roller 310 with respect to the vertical direction and in a range overlapping with the fixing belt 301 in the case where the fixing roller 310 is viewed from above. In other words, the piping member 402*b* is disposed, as shown in FIG. 8, in a silhouette S where an upper-side surface of the fixing roller 310 is projected above. Further, the piping member 402*b* is disposed, similarly as in the first embodiment, between the fixing roller 310 and the cover 500 (see FIG. 3) of the fixing device 8A.

Further, the piping member 402*b* is disposed, as shown in FIG. 9, along the widthwise direction crossing the recording material embodiment direction. Further, the piping member 402*b* is positioned, as shown in FIG. 8, on a downstream side of the rotational direction of the fixing roller 310 than a highest position (top) of the fixing roller 310 with respect to the vertical direction is.

Also, in the case of the thus-constituted this embodiment, in a constitution in which the recording material is peeled off from the fixing roller 310 by blowing the air to the recording material, it is possible to suppress occurrence of uneven glossiness on the toner image. That is, also, in the case of this embodiment, the piping member 402*b* which is a part of the air passage 402 is disposed above the fixing roller 310. For this reason, the air heated by the fixing roller 310 is raised, so that the piping member 402*b* is heated by this air. Then, the air flowing inside the piping member 402*b* is also heated, so that it is possible to blow warm air from the air nozzles 401 toward the recording material. As a result, a temperature distribution generated by the air blown from the air nozzles 401 can be made small, so that the occurrence of the uneven glossiness can be suppressed.

Third Embodiments

In the above-described first embodiment, the constitution in which the heating roller is provided with the halogen heater as the heating portion for heating the fixing belt was described. However, the heating portion may also be provided in the stretching member such as the steering roller without being provided in the heating roller. Further, the heating source may also be provided in the pad member. For example, a plate-like heating member such as a ceramic heater may also be provided on the fixing belt side of the pad member. Further, a constitution in which the fixing belt is heated through electromagnetic induction (IH) heating may also be employed. Further, in the above-described first and second embodiments, instead of the heating portion disposed inside the roller, an external heating type in which another heating member is contacted to the belt or the roller to heat the belt or the roller may be employed.

Further, in the above-described first embodiment, the fixing device in which the fixing belt is stretched by the fixing pad, the heating roller and the steering roller was described. However, the fixing device to which the present invention is applicable is not limited thereto, but for example, a constitution in which the fixing belt is stretched by only a single stretching roller and the fixing pad may also be employed. In summary, it is only required that at least one stretching roller for stretching the fixing belt is provided together with the fixing pad.

Further, in the above-described first embodiment, the constitution in which the pressing roller is used as the rotatable driving member was described. However, the rotatable driving member may also be an endless belt which is stretched by a plurality of stretching rollers and which is driven by either one of the stretching rollers. Further, in the above-described embodiments, in order to form the nip, the pressing roller as the rotatable driving member is pressed against the belt, but a constitution in which the belt is pressed against the rotatable driving member may also be employed.

Further, in the above-described embodiments, the piping member 402*b* as the part of the air passage 402 was disposed above the fixing belt 301 or the fixing roller 310 as the fixing member, but may also be disposed above a member, which does not directly contact the recording material, of the external heating type or the like. For example, in the case of a constitution in which an external heating belt is contacted to the fixing belt 301 or the fixing roller 310 and in which a heating portion is disposed inside a roller stretching the external heating belt, the piping member 402*b* is disposed above this external heating belt with respect to the vertical direction and is disposed in a range overlapping with the external heating belt in the case where the external heating belt is viewed from above. This is also true for the case where an external heating roller including a heating portion therein is contacted to the fixing belt 301 or the fixing roller 310.

Fourth Embodiment

In this embodiment, air flows in a piping member 402*f* to which radiant heat of the fixing belt 301 is imparted, and thus is increased in temperature until the air is ejected from the air nozzle 401. In contrast thereto, the piping member 402*f* itself is cooled by the air flowing an inside thereof, and therefore, is lowered in temperature than another component part at a periphery of the fixing belt 301. Here, a wax component is contained in the toner in order to improve the parting property from the toner and to impart feeling of glossiness to an output image. This wax component is vaporized from the toner when the toner image is heated and fed from the fixing device 8, and is condensed and deposited in the form of droplets on the surface of the component part at a periphery of the fixing belt 301 in some cases.

In general, condensation of the wax component is generated by cooling the vaporized wax component. For that reason, in the neighborhood of the piping member 402*f* cooled by the air during heat-feeding of the toner image, the condensation of the wax component is liable to generate, so that there is a possibility that the deposited wax component is accumulated to become a large droplet and then is dropped by gravitation. Particularly, in this embodiment, the piping member **402*f* is disposed above the fixing belt 301, and therefore, the wax component changed to droplets in the piping member 402*f* drops on the fixing belt 301, so that there is a liability that the wax component is deposited on the recording material via the fixing belt 301 and thus the toner image is contaminated with the wax component. Incidentally, even when the piping member 402*f* is positioned on a side of the fixing belt 301, there is a liability that the wax component in the form of droplets is directly dropped from the piping member 402*f*** onto the recording material. Accordingly, in either case, the toner image on the recording material is contaminated with the wax component, so that there is a liability that an image defect occurs. Therefore, in this embodiment, the following constitution is employed.

Wax Absorbing Member

As shown in FIG. 10, FIG. 11, and parts (a) and (b) of FIG. 12, the piping member **420*f* is covered with a nonwoven fabric sheet 430 as a wax absorbing member capable of absorbing the wax component vaporized from the toner. That is, in this embodiment, as the wax absorbing member, a nonwoven fabric is used. The nonwoven fabric sheet 430 uses, for example, a 0.7 mm-thick sheet-like nonwoven fabric. In this embodiment, onto a surface of the piping member 402*f*, as shown in parts (a) and (b) of FIG. 12, the nonwoven fabric sheet 430** is applied with a double-side tape so as to surround the piping member surface.

Further, in this embodiment, a gap 431 for preventing overlapping of end parts of the nonwoven fabric sheet 430 with each other is provided. That is, the nonwoven fabric sheet 430 is provided so as to cover a periphery of the piping member **420*f* with the gap 431 at a part of the periphery of the piping member 402*f*. The gap 431 is provided along a longitudinal direction of the piping member 402*f*. The reason why such a gap 431 is formed is that partial overlapping of the nonwoven fabric sheet 430 is prevented. If an overlapping portion generates as a result of covering of the periphery of the piping member 402*f* with the nonwoven fabric sheet 430, there is a liability that thermal conductivity lowers at this portion and that peeling occurs from the overlapping portion as a starting point. On the other hand, it is difficult that the nonwoven fabric sheet 430 is wound about the periphery of the piping member 402*f* so as not to form the gap. For this reason, in this embodiment, the piping member 402*f* is covered with the nonwoven fabric sheet 430 so as to form the gap 431**.

This gap 431 is formed so as to be positioned, with respect to the vertical direction, above a horizontal line H (part (b) of FIG. 12) passing through a center of a cylindrical piping member **402*f*. There is a liability that the wax component floating at the periphery of the piping member 402*f* enters the piping member 402*f* from the gap 431 and is deposited on the piping member 402*f*. The wax component entering the piping member 402*f* from the gap 431 and deposited on the piping member 402*f* is cooled by the piping member 402*f*, and thus is liable to become a droplet. In the case where if the gap 431 is directed downward, the wax component in the form of the droplet is dropped from the gap 431, and causes the above-described image defect. Therefore, in this embodiment, the position of the gap 431 is above the above-described horizontal line H with respect to the vertical direction. In this embodiment, the gap 431 opens upward, and was disposed so as to be positioned on a side opposite from the fixing belt 301 with respect to the piping member 402*f***.

Further, in this embodiment, in order to ensure the grounding of the piping member **402*f*, the nonwoven fabric sheet 430 is provided with a cut-away portion 432 for the grounding. Also, this cut-away portion 432 is positioned above the horizontal line H similarly as the gap 431, and the gap 431 is open upward in this embodiment. To the cut-away portion 432 for the grounding, an unshown metal component part such as a spring is contacted, and is grounded via the frame or the like of the fixing device 8, so that occurrence of noise due to charging of the piping member 402*f*** is prevented.

Incidentally, the wax absorbing member may be felt or a porous material prepared such that a resin material is foamed and molded when the felt or the porous material can absorb or hold the wax component. That is, the wax absorbing member may also be a material other than the nonwoven fabric when the material is wound about the piping member **402*f* and can absorb the wax. Further, the wax absorbing member may also be constituted by electrostatically flocking many short fibers directly on the surface of the piping member 402*f*. In this embodiment, a heat-resistant nonwoven fabric by which an effect of absorbing the wax component and of being held between fibers can be confirmed is employed. The nonwoven fabric sheet 430 is a thin sheet and therefore is easy to be applied onto the piping member 402*f*. Further, the nonwoven fabric sheet 430 also has advantages such that compared with the felt, the porous material, and the electrostatic flocking, the nonwoven fabric sheet 430 is inexpensive and easy to be processed, and is hard to be peeled off even when the nonwoven fabric sheet 430 is applied to the piping member 402*f***.

Incidentally, the nonwoven fabric sheet 430 may be black at least at a surface thereof, and entirety thereof including an inside may be black. In either case, in the case where the nonwoven fabric sheet 430 is black, emissivity of the nonwoven fabric sheet 430 in a range of 8 μm or more and 14 μm or less in far-infrared wavelength may preferably be higher than that of the piping member **402*f*, and may preferably be 0.8 or more. Thus, the nonwoven fabric sheet 430 is made black, so that the nonwoven fabric sheet 430 functions as a heat absorbing layer. That is, the piping member 402*f* efficiently absorbs heat from the fixing belt 301 through the nonwoven fabric sheet 430 and can efficiently heat the air passing through the inside of the piping member 402*f***.

In the case of the thus-constituted this embodiment, in a constitution in which the recording material is peeled off from the fixing belt 301 by blowing the air to the recording material, it is possible suppress that the uneven glossiness occurs on the toner image and that the image defect occurs by the droplet of the wax component. In the following, description will be made specifically. When the recording material P on which the toner image is formed is heated, and fed by the fixing device 8, as regards the wax component contained in the toner, a portion thereof which is not transferred on the recording material P is vaporized or remains on the surface of the fixing belt 301, and then is heated again by the heating roller 307, so that the wax component is vaporized. The vaporized wax component is raised to a position where the piping member **402*f* is disposed, from above the fixing belt 301 or a side of the fixing belt 301**.

During operation of the image forming apparatus 1, simultaneously with heating of the compressed air passing through the inside of the piping member 402*f*, the piping member 402*f* itself is cooled by the compressed air, and therefore, a surface temperature of the piping member 402*f* lowers compared with the peripheral component part. For that reason, the vaporized wax component is condensed by being cooled in the neighborhood of the piping member 402*f*, and becomes a liquid, so that the wax component is deposited on the surface of the piping member 402*f*. In the case where the piping member 402*f* is not cover with the wax absorbing member, with continuous use of the image forming apparatus, on the surface of the piping member 402*f*, the wax component is accumulated and grows into a large droplet, and therefore, the wax component is dropped onto the fixing belt 301 or the feeding passage of the recording material P, so that there was a possibility that the toner image formed on the recording material P is contaminated with the wax component and thus the image defect is caused to occur.

On the other hand, in this embodiment, in the case where the wax component is condensed and deposited in the form of the liquid in the neighborhood of the surface of the nonwoven fabric sheet 430 provided on the surface of the piping member 402*f*, the wax component is absorbed in the nonwoven fabric sheet 430 or is held between the fibers, or is penetrated and diffused into between the fibers by capillary phenomenon. By this, growth of a large wax component into a droplet is suppressed, and therefore, it is possible to suppress that the droplet of the wax component is dropped on the fixing belt 301 or the feeding passage, so that the occurrence of the image defect can be suppressed.

Fifth Embodiment

Heat Absorbing Layer

As described above, the piping member 402*b* which is a part of the air passage 402 is disposed above the fixing belt 301, so that the air flowing inside the piping member 402*b* is heated, but in this embodiment, as described in the following, a constitution in which the air flowing inside the piping member 402*b* is more efficiently heated is employed. That is, in this embodiment, as shown in FIG. 13, the piping member 402*b* is covered with a black paint 402*g* as a heat absorbing layer higher in emissivity in a range of 8 μm or more and 14 μm or less in far-infrared wavelength than the piping member 402*b*. The black paint 402*g* may preferably have emissivity of 0.8 or more in the range of 8 μm or more and 14 μm or less in far-infrared wavelength. As a method of coloring the piping member 402*b* black, it is possible to cite black body painting or blackening treatment.

As described above, the piping member 402*b* is a rubber tube formed of a heat-resistant material such as the silicone rubber. In this embodiment, this rubber tube is subjected to the black (body) painting. Specifically, as the black paint 402*g*, the piping member 402*b* is coated with a black fluorine-containing resin material (for example, PTFE (polytetrafluoroethylene).

Incidentally, a region where the black paint 402*g* is coated on the piping member 402*b* may be a part of the piping member 402*b*. That is, of a region of the piping member 402*b* opposing the fixing belt 301 with respect to a direction perpendicular to the widthwise direction of the fixing belt 301, the black paint 402*g* may be coated in a part of the region. However, an entire area of this region may preferably be coated with the black paint 402*g*, and the black paint 402*g* may be coated to an outside of a region, of the air passage 402, opposing the fixing belt 301 with respect to the direction perpendicular to the widthwise direction of the fixing belt 301.

Next, by using a list of thermophysical property of materials shown in a table 1 below, the reason why the piping member 402*b* is more heated by coating the piping member 402*b* with the black paint 402*g* as the heat absorbing layer will be described. The table 1 is a table in which the emissivity in the range of 8 μm or more and 14 μm or less (8 μm to 14 μm) in the far-infrared wavelength of each of an aluminum alloy, a silicone rubber, and a black PTFE coating was compared with each other.

TABLE 1

| Material | EM*[4] |
|---|---|
| AA*[1] | 0.1 |
| SR*[2] | 0.6 |
| BP*[3] | 0.8 |

*[1]"AA" is the aluminum alloy.
*[2]"SR" is the silicone rubber.
*[3]"BP" is the black paint (PTFE coating).
*[4]"EM" is the emissivity in the far-infrared wavelength range of 8 μm to 14 μm.

The piping member 402*b* has a function of heating the inside air by indirectly conducting the heat from the fixing belt 301. At that time, in order to efficiently heat the inside air, it is important to efficiently obtain the heat from the fixing belt 301. From the table 1, the emissivity of the black PTFE coating is higher than the emissivity of the silicone rubber. Therefore, the piping member 402*b* formed of the silicone rubber is subjected to the black PTFE coating as the black paint 402*g*, so that it becomes possible to efficiently conduct the heat to the piping member 402*b*, so that the temperature of the air passing through the inside of the piping member 402*b* can be increased. In the case of this embodiment, during the operation of the image forming apparatus 1, the piping member 402*b* is heated to about 85° C. to 95° C. by the heat from the fixing belt 301. This temperature is higher than a temperature in the case where the piping member 402*b* is not covered with the black paint 402*g* (comparison example 1), and as a result of actual comparison, it turned out that the piping member 402*b* was heated to a temperature higher than a temperature in the case of the comparison example 1 by 5° C.

In FIG. 14, a relationship between a temperature measuring position of the air passage 402A and an inside air temperature at the position in each of the embodiment 5 (fifth embodiment) in which the piping member 402*b* is subjected to the black painting and the comparison example 1 is shown. Incidentally, 402*d*(1) to 402*d*(4) which are represented as the temperature measuring positions in the abscissa of FIG. 14 correspond to positions of the tube joints 402*d*(1) to 402*d*(4), respectively, shown in FIG. 13. Temperature measurement was made in such a manner that a thermocouple is provided so as not to contact an inner surface of the tube and the inside air temperature at each of the positions was measured by the thermocouple.

As is apparent from FIG. 14, in the embodiment 5 using the piping member 402*b* coated with the black paint 402*g*, compared with the comparison example 1 using the piping member 402*b* which is not coated with the black paint 402*g*, it turned out that the temperature of the air passing through the air passage 402A becomes high.

Sixth Embodiment

A sixth embodiment will be described using FIG. 15. In the above-described fifth embodiment (embodiment 5), the case where the piping member 402*b* is the rubber tube was described. On the other hand, in this embodiment, a piping member 402*f* is formed of metal.

In this embodiment, the piping member 402*f* is a metal pipe which is formed of an aluminum alloy and which is about φ9 mm in inner diameter and about 1 mm in thickness, and a surface of the metal pipe is subjected to coating of a black paint 402*h*, as a heat absorbing layer, high in emissivity in an infrared region. The black paint 402*h* is higher in emissivity in a range of 8 μm or more and 14 μm or less in far-infrared wavelength than the piping member 402*f*, and the emissivity of the black paint 402*h* may preferably be 0.8 or more in the range of 8 μm and 14 μm or less. As a method of coloring the piping member 402*f* black, it is possible to cite black painting or blackening treatment.

In this embodiment, as the black paint 402*h*, coating of "Okitumo (trade name)" manufactured by Okitumo Inc. was used. As a material other than "Okitumo", "TETZSOL (trade name)" manufactured by Nippon Point Co., Ltd. can be used as the black paint 402*h*. Incidentally, a region where the piping member 402*f* is coated with the black paint 402*h* is similar to the region in the first embodiment.

Next, by using a list of thermophysical properties of materials shown in a table 2 below, the reason why the piping member 402*f* is more heated by changing the material of the piping member 402*f* from the silicone rubber to the aluminum alloy will be described. The table 2 is a table in which specific heat, density, thermal conductivity, and heat (thermal) capacity of each of the aluminum alloy, stainless steel (SUS304), copper, and the silicone rubber are compared with each other. In the case where the thermal conductivity is calculated, calculation was made under a condition of about φ9 mm in inner diameter, about 1 mm in thickness, and 350 mm in length with respect to a widthwise direction of the pipe.

TABLE 2

| Material | SH*5 [J/g · K] | D*6 [g/cm$^3$] | TC*7 [W/mK] | HC*8 [J/K] |
|---|---|---|---|---|
| AA*1 | 0.94 | 2.7 | 113 | 132 |
| SS*2 | 0.5 | 7.93 | 16.3 | 207 |
| C*3 | 0.42 | 8.9 | 372 | 195 |
| SR*4 | 1.6 | 0.97 | 0.2 | 81 |

*1"AA" is the aluminum alloy.
*2"SS" is the stainless steel (SUS304).
*3"C" is the copper.
*4"SR" is the silicone rubber.
*5"SH" is the specific heat.
*6"D" is the density.
*7"TC" is the thermal conductivity.
*8"HC" is the heat capacity.

The piping member 402*f* has a function of heating the inside air by causing the black paint 402*h* as the heat absorbing layer to absorb the heat from the fixing belt 301 and by conducting the absorbed heat to the inside air. At that time, in order to efficiently heat the inside air, the following three viewpoints are important.

1. The piping member 402*f* efficiently obtains the heat from the fixing belt 301.
2: The piping member 402*f* efficiently obtains the heat from the black paint 402*h*.
3. The piping member 402*f* efficiently conducts the heat to the inside air.

In the above-described viewpoint "2", it is important that the thermal conductivity of the piping member 402*f* is large, and in the above-described viewpoint "3", it is important that the heat capacity of the piping member 402*f* is small. In a similar shape, when the heat capacity is compared between the metal, such as the aluminum alloy, the stainless steel (SUS304), and the copper, and the silicone rubber, resultant values are not so different. However, when the thermal conductivity is compared between the metal and the silicone rubber, it is understood that resultant values of the metal are larger than a resultant value of the silicone rubber by about 100 to 500 times. Accordingly, the piping member 402*f* is formed of the metal and is efficiently warmed by efficiently conducting the heat, absorbed by the black paint 402*h*, to the piping member 402*f*, with the result that the temperature of the air passing through the inside of the piping member 402*f* can be increased. In this embodiment, during the operation of the image forming apparatus, the piping member 402*f* is heated to about 95° C. to 100° C. by the heat from the fixing belt 301.

Seventh Embodiment

A seventh embodiment will be described using FIG. 16. In this embodiment, the piping member 402*f* is covered with a nonwoven fabric sheet at least of which surface is black. The piping member 402*f* may be formed of metal or a rubber tube. In order to efficiently warm the air inside the pipe, the piping member 402*f* formed of metal may preferably be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-166245 filed on Oct. 17, 2022, 2022-166247 filed on Oct. 17, 2022, and 2022-166250 filed on Oct. 17, 2022, which are hereby incorporated by reference herein in their entirety.

What is claimed is:

1. An image forming apparatus comprising:

a first rotatable member configured to heat a toner image formed on a recording material;

a second rotatable member configured to form a nip in contact with the first rotatable member, wherein the second rotatable member applies pressure to the recording material, on which the toner image is carried, in the nip in cooperation with the first rotatable member to fix the toner image on the recording material;

an air nozzle configured to blow air toward the recording material and the first rotatable member on a side downstream of the nip with respect to a feeding direction of the recording material; and a pipe made of metal, configured to guide air to the air nozzle and provided to oppose the first rotatable member, wherein the pipe includes a portion extending along a widthwise direction of the first rotatable member perpendicular to the feeding direction, and wherein in a case that the pipe is viewed from above with respect to the vertical direction, the portion includes a region overlapping with the first rotatable member.

2. An image forming apparatus according to claim 1, wherein the pipe is provided above the nip with respect to a vertical direction.

3. An image forming apparatus according to claim 2, further comprising a cover movable to a covering position where the cover covers the first rotatable member and an exposing position where an upper part of the first rotatable member is exposed and where the first rotatable member is removable, wherein in a state in which the cover is in the covering position, the portion is positioned inside the cover.

4. An image forming apparatus according to claim 1, wherein further comprising a compressor configured to compress the air so as to discharge the compressed air from the air nozzle.

5. An image forming apparatus according to claim 4, wherein the compressor is provided on a rear side of the image forming apparatus than the first rotatable member.

6. An image forming apparatus according to claim 5, wherein a connecting position between the air nozzle and the pipe is on a front side of the image forming apparatus than the second rotatable member.

7. An image forming apparatus according to claim 1, wherein the first rotatable member is a belt.

8. An image forming apparatus according to claim 7, further comprising a heating roller configured to stretch and heat the belt, wherein with respect to a rotational direction of the first rotatable member, the pipe is provided downstream of the heating roller and upstream of the nip.

9. An image forming apparatus according to claim 1, wherein with respect to the widthwise direction, the air nozzle is provided with a plurality of holes through which the air is blown out.

10. An image forming apparatus according to claim 1, further comprising a wax absorbing member configured to cover the pipe and capable of absorbing a wax component vaporized from toner.

11. An image forming apparatus according to claim 10, wherein the wax absorbing member is a nonwoven fabric.

12. An image forming apparatus according to claim 11, wherein the wax absorbing member is provided so as to cover a periphery of the pipe with a gap from a part of the periphery of the pipe, and wherein with respect to a vertical direction, the gap is positioned above a horizontal line passing through a center of the pipe.

13. An image forming apparatus according to claim 10, wherein a surface of the wax absorbing member is black and is 0.8 or more in emissivity in a range of 8 μm or more and 14 μm or less in far-infrared wavelength.

14. An image forming apparatus according to claim 1, wherein a surface of the pipe is painted black and is 0.8 or more in emissivity in a range of 8 μm or more and 14 μm or less in far-infrared wavelength.

15. An image forming apparatus according to claim 1, further comprising a feeding passage configured to feed air between the pipe and the air nozzle, wherein the feeding passage is a tube made of rubber, and wherein the tube is disposed outside the first rotatable member with respect to the widthwise direction of the first rotatable member.

16. An image forming apparatus according to claim 1, wherein in the widthwise direction of the first rotatable member, one end of the pipe is connected to a first connecting portion disposed outside one end of the first rotatable member and the other end of the pipe is connected to a second connecting portion disposed outside the other end of the first rotatable member.

17. An image forming apparatus comprising:

a first rotatable member configured to heat a toner image formed on a recording material;

a second rotatable member configured to form a nip in contact with the first rotatable member, wherein the second rotatable member applies pressure to the recording material, on which the toner image is carried, in the nip in cooperation with the first rotatable member to fix the toner image on the recording material;

an air nozzle configured to blow air toward the recording material and the first rotatable member on a side downstream of the nip with respect to a feeding direction of the recording material;

a cover movable to a covering position where the cover covers the first rotatable member and a position where an upper part of the first rotatable member is exposed and where the first rotatable member is removable, and a pipe made of metal, configured to guide air to the air nozzle and provided to oppose the first rotatable member, wherein the pipe includes a portion extending along a widthwise direction of the first rotatable member perpendicular to the feeding direction, wherein the pipe is provided above the nip with respect to a vertical direction, and wherein in a state in which the cover is in the covering position, the portion is positioned inside the cover.

18. An image forming apparatus according to claim 17, wherein in a case that the pipe is viewed from above with respect to the vertical direction, the portion includes a region overlapping with the first rotatable member.

19. An image forming apparatus according to claim 17, wherein further comprising a compressor configured to compress the air so as to discharge the compressed air from the air nozzle.

20. An image forming apparatus according to claim 17, further comprising a feeding passage configured to feed air between the pipe and the air nozzle, wherein the feeding passage is a tube made of rubber, and wherein the tube is disposed outside the first rotatable member with respect to the widthwise direction of the first rotatable member.

21. An image forming apparatus according to claim 17, wherein in the widthwise direction of the first rotatable member, one end of the pipe is connected to a first connecting portion disposed outside one end of the first rotatable member and the other end of the pipe is connected to a second connecting portion disposed outside the other end of the first rotatable member.

22. An image forming apparatus comprising:

a first rotatable member configured to heat a toner image formed on a recording material;

a second rotatable member configured to form a nip in contact with the first rotatable member, wherein the second rotatable member applies pressure to the recording material, on which the toner image is carried, in the nip in cooperation with the first rotatable member to fix the toner image on the recording material;

an air nozzle configured to blow air toward the recording material and the first rotatable member on a side downstream of the nip with respect to a feeding direction of the recording material; and a pipe made of metal, configured to guide air to the air nozzle and provided to oppose the first rotatable member, wherein the pipe includes a portion extending along a widthwise direction of the first rotatable member perpendicular to the feeding direction, wherein the first rotatable member is a belt, and includes a heating roller configured to stretch and heat the belt, and wherein with respect to a rotational direction of the first rotatable member, the pipe is provided to oppose a region of the belt downstream of the heating roller and upstream of the nip.

* * * * *